US011252751B2

(12) United States Patent
Takeda et al.

(10) Patent No.: US 11,252,751 B2
(45) Date of Patent: Feb. 15, 2022

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 783 days.

(21) Appl. No.: 16/065,288

(22) PCT Filed: Dec. 22, 2016

(86) PCT No.: PCT/JP2016/088276
§ 371 (c)(1),
(2) Date: Jun. 22, 2018

(87) PCT Pub. No.: WO2017/110962
PCT Pub. Date: Jun. 29, 2017

(65) Prior Publication Data
US 2021/0168843 A1 Jun. 3, 2021

(30) Foreign Application Priority Data
Dec. 25, 2015 (JP) .............................. JP2015-255283

(51) Int. Cl.
*H04W 4/00* (2018.01)
*H04W 72/12* (2009.01)
(Continued)

(52) U.S. Cl.
CPC ... *H04W 72/1289* (2013.01); *H04W 56/0045* (2013.01); *H04W 72/0446* (2013.01); *H04W 72/1257* (2013.01); *H04W 80/02* (2013.01)

(58) Field of Classification Search
CPC ......... H04W 72/1289; H04W 56/0045; H04W 72/0446; H04W 72/1257
See application file for complete search history.

(56) References Cited

U.S. PATENT DOCUMENTS

2014/0016593 A1\* 1/2014 Park .................... H04W 74/004
370/329
2015/0334709 A1 11/2015 Ji et al.
(Continued)

OTHER PUBLICATIONS

Extended European Search Report issued in the counterpart European Patent Application No. 16878849.5, dated Jun. 14, 2019 (10 pages).
(Continued)

*Primary Examiner* — Siren Wei
(74) *Attorney, Agent, or Firm* — Osha Bergman Watanabe & Burton LLP

(57) ABSTRACT

The present invention is designed so that adequate timing control is allowed even when shortened. TTIs are used. A user terminal communicates using a shortened transmission time interval (TTI), in which the TTI duration is shorter than one ms, and has a receiving section that receives a DL signal transmitted from the radio base station, and a control section that controls transmission of a UL signal based on the DL signal, and the control section controls a random access procedure based on the shortened TTI and/or a normal TTI having a TTI duration of one ms.

6 Claims, 20 Drawing Sheets

(51) Int. Cl.
*H04W 56/00* (2009.01)
*H04W 72/04* (2009.01)
*H04W 80/02* (2009.01)

(56) References Cited

U.S. PATENT DOCUMENTS

| | | | | |
|---|---|---|---|---|
| 2017/0150391 A1* | 5/2017 | Bergquist | .......... | H04W 28/0205 |
| 2017/0290008 A1* | 10/2017 | Tooher | .................. | H04L 1/1893 |
| 2017/0331547 A1* | 11/2017 | Kim | ...................... | H04L 5/0012 |
| 2018/0227958 A1* | 8/2018 | Xiong | ............... | H04W 74/0833 |

OTHER PUBLICATIONS

InterDigital Communications; "Support for Short TTIs and Processing Times in LTE"; 3GPP TSG-RAN WG1 #83, R1-157136; Anaheim, USA; Nov. 16-20, 2015 (6 pages).

ZTE; "Utilization of short TTI in higher layer"; 3GPP TSG-RAN WG2 meeting #91bis, R2-154172; Malmo, Sweden; Oct. 5-9, 2015 (3 pages).

3GPP TS 36.321 V12.7.0; "3rd Generation Partnership Project; Technical Specification Group Radio Access Network; Evolved Universal Terrestrial Radio Access (E-UTRA); Medium Access Control (MAC) protocol specification (Release 12)" Sep. 2015 (7 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

International Search Report issued in PCT/JP2016/088276 dated Mar. 14, 2017 (4 pages).

Written Opinion issued in PCT/JP2016/088276 dated Mar. 14, 2017 (6 pages).

Office Action in counterpart European Patent Application No. 16 878 849.5 dated Apr. 14, 2021 (5 pages).

* cited by examiner

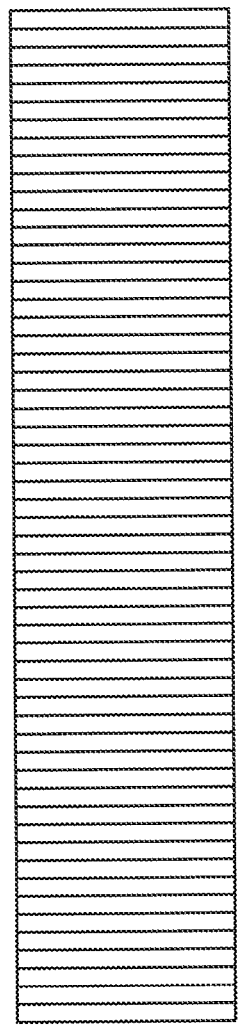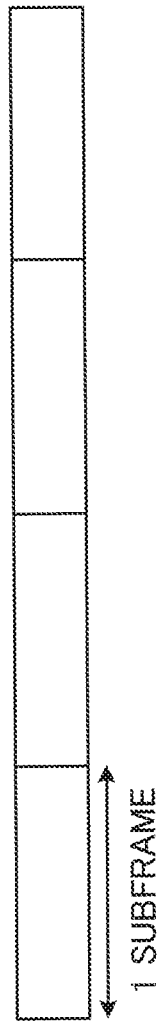
FIG. 2A CC#2 SHORTENED TTI IS USED
FIG. 2B CC#1 NORMAL TTI IS USED
1 SUBFRAME

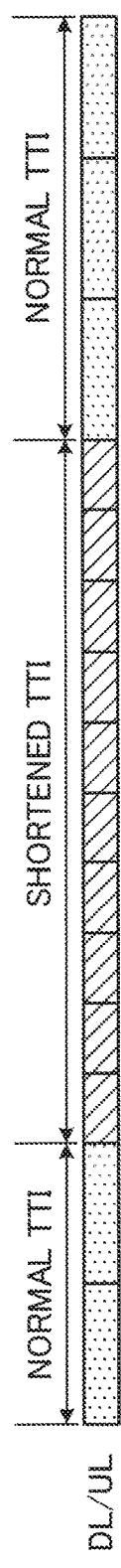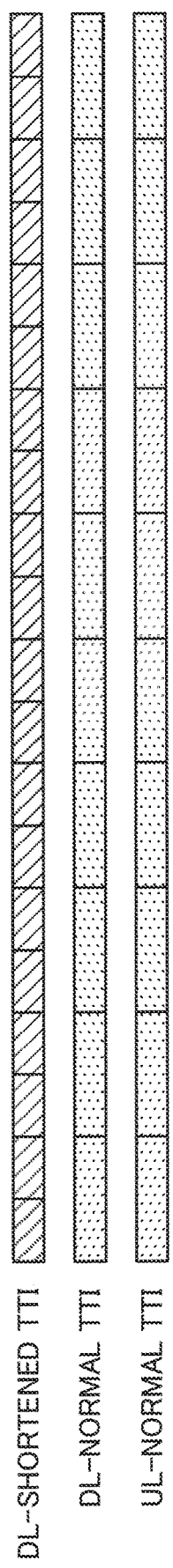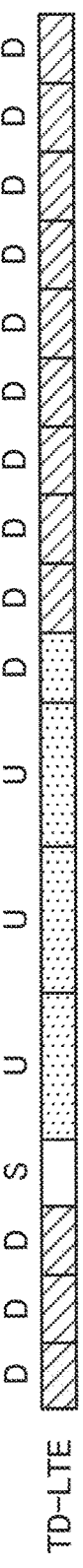
FIG. 4A
FIG. 4B
FIG. 4C

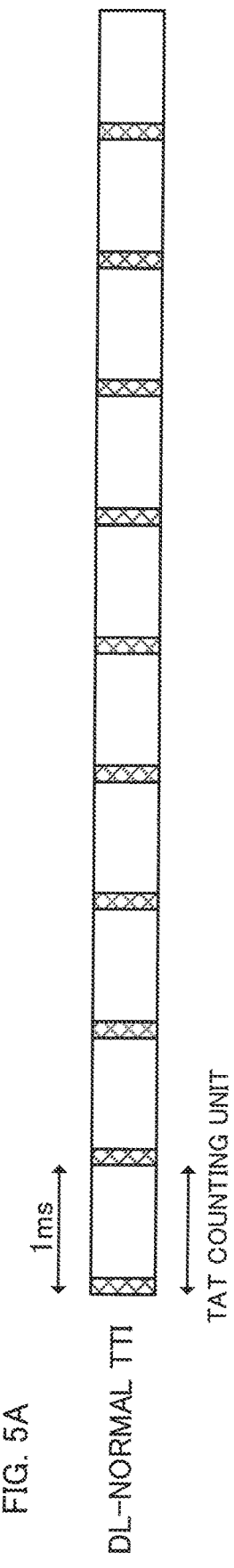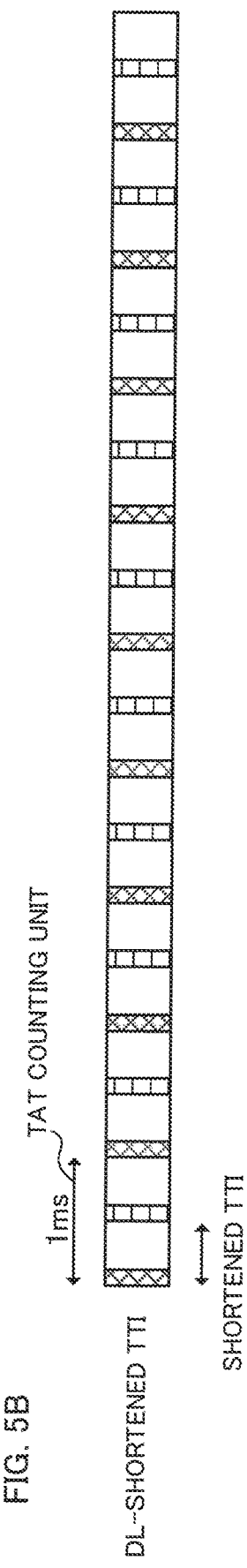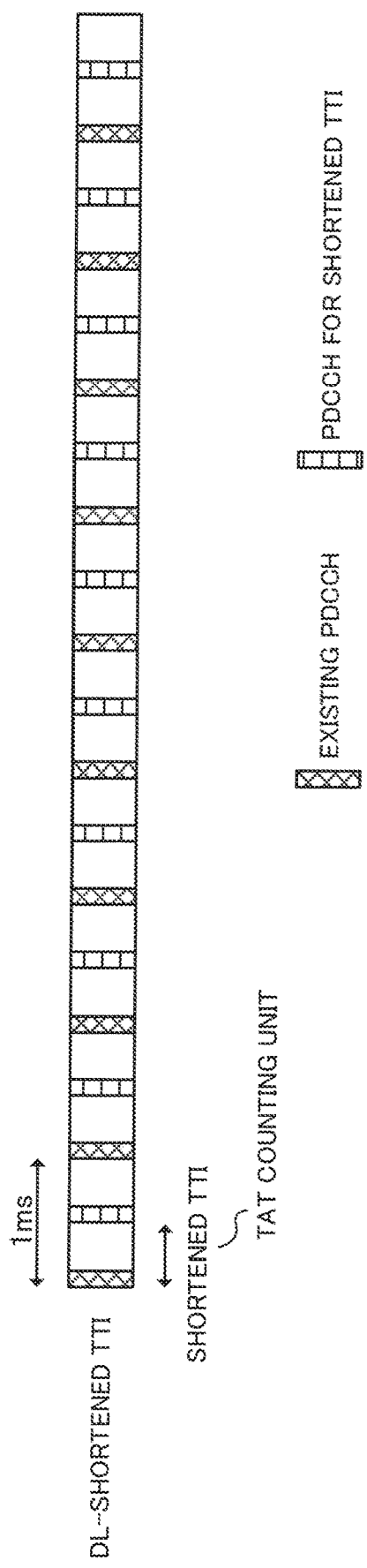

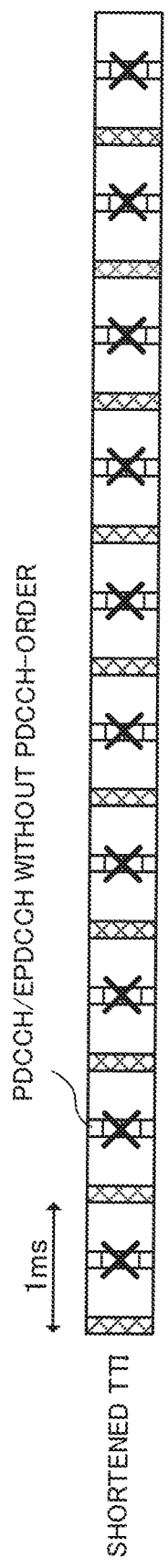
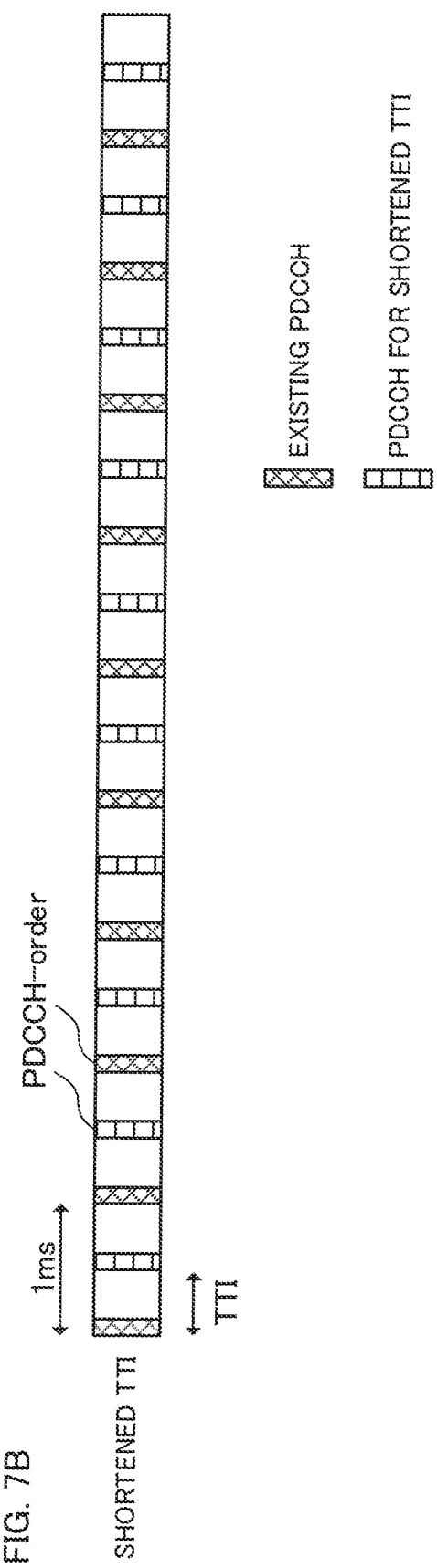
FIG. 7A
FIG. 7B

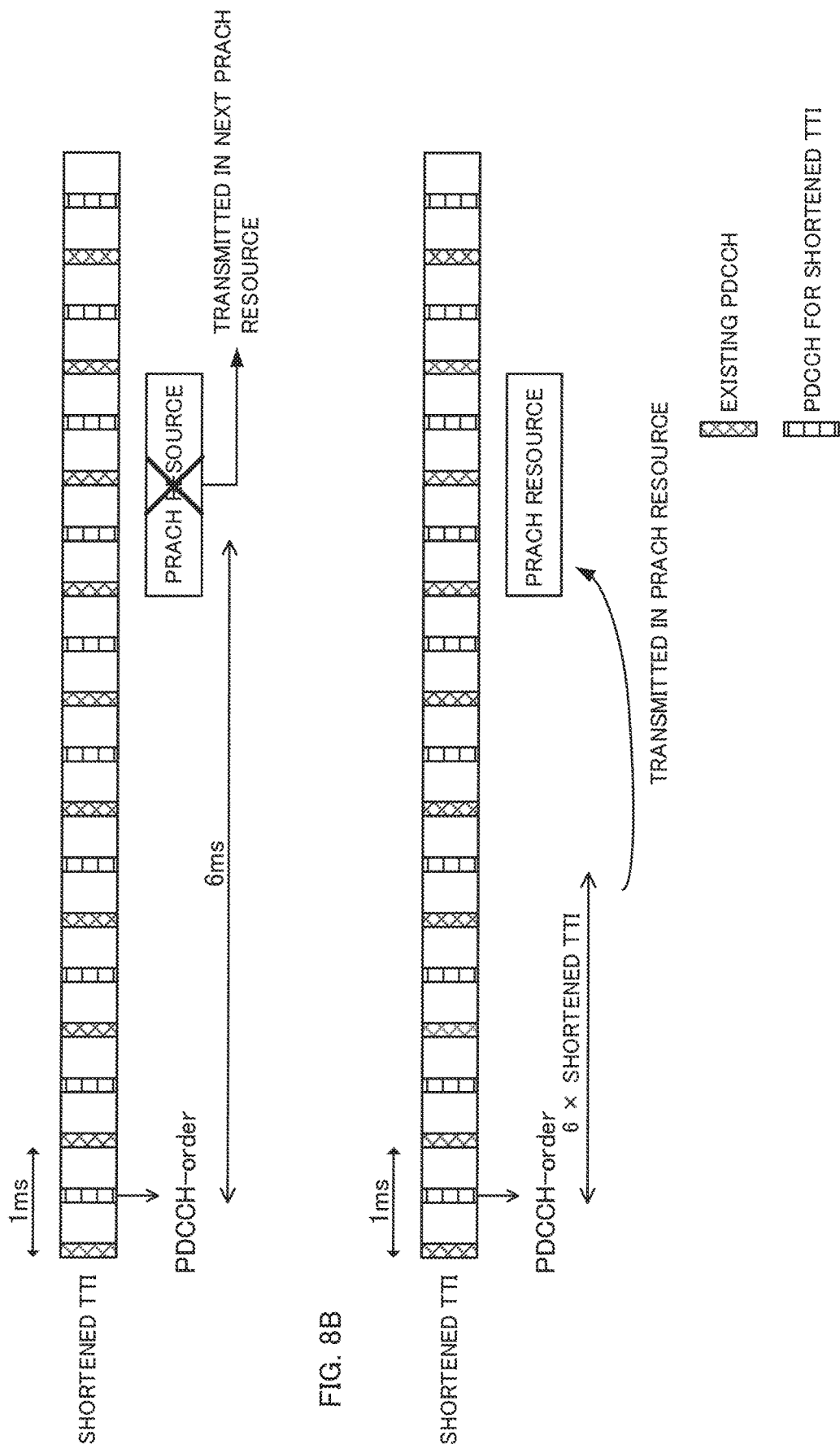

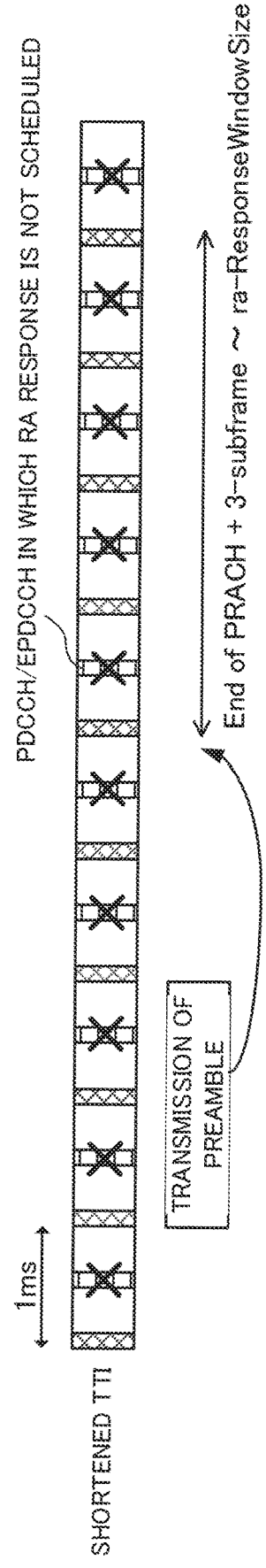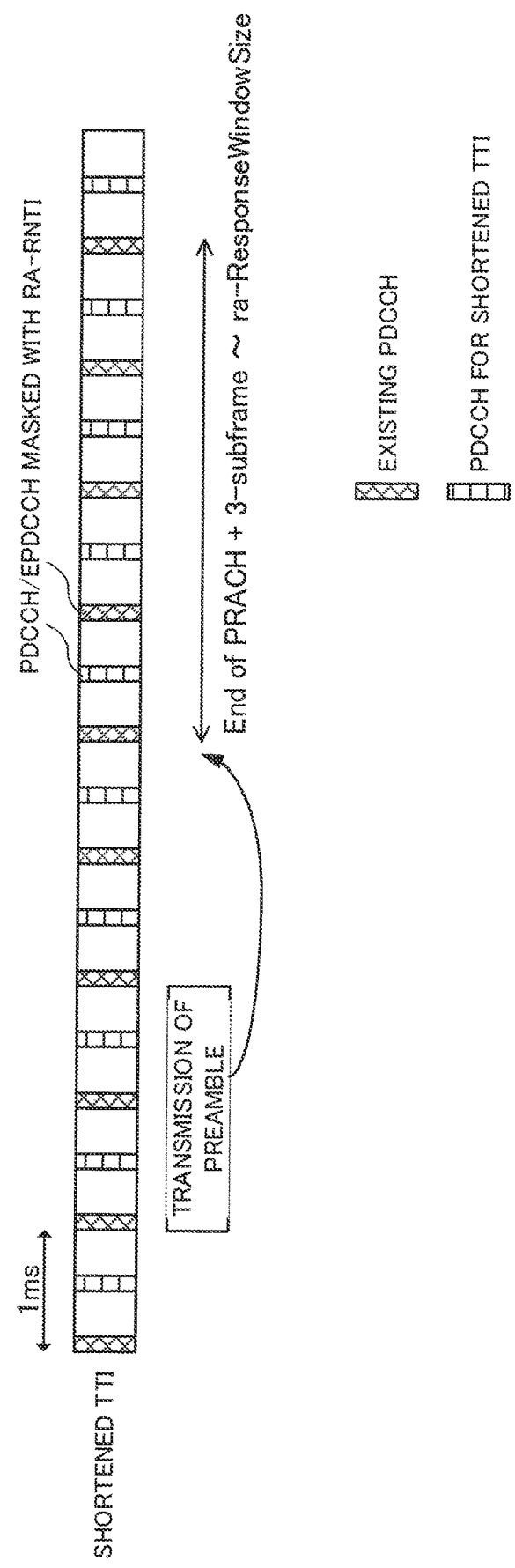
FIG. 9A
FIG. 9B

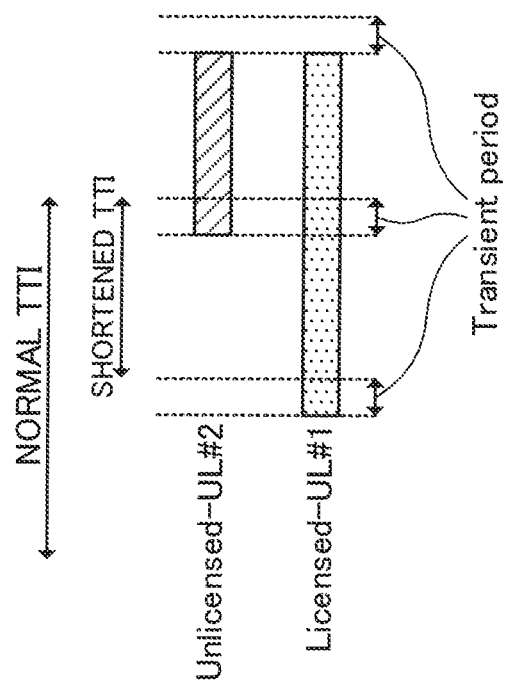
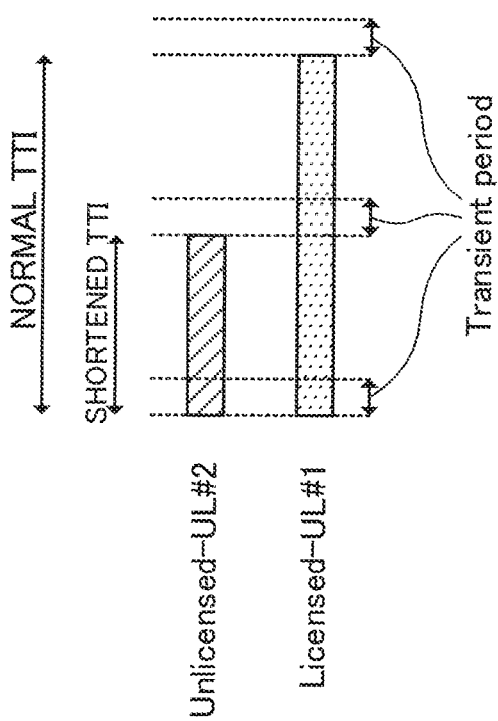
FIG. 14

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART in the UMTS (Universal Mobile Telecommunication System) network, the specifications of long term evolution (LTE) have been drafted for the purpose of further increasing high speed data rates, providing lower delays and so on (see non-patent literature 1). The specifications of LTE-advanced (also referred to as "LTE Rel. 10, 11 or 12") have been drafted for the purpose of further broadbandization and speed-up from LTE (also referred to as "LTE Rel. 8"), and a successor system (also referred to as "LTE Rel. 13" or the like) is also under study.

Carrier aggregation (CA) to integrate multiple component carriers (CC) is introduced in LTE Rel. 10/11 in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

On the other hand, in LTE Rel. 12, dual connectivity (DC), in which multiple cell groups (CG) formed by different radio base stations are configured in a user terminal, is also introduced. Each cell group consists of at least one cell (CC). In DC, since multiple CCs of different radio base stations are integrated, DC is also referred to as "inter-eNB CA."

In above-mentioned LTE Rel. 8 to 12, the transmission time intervals (TTIs) that are applied to DL transmission and UL transmission between radio base stations and user terminals are configured to one ms and controlled. Transmission time intervals are also referred to as "communication time intervals," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In radio communication systems after LTE Rel. 13 (for example, 5G), it is assumed that communication in a high frequency band such as several tens of GHz, or communication with a relatively small amount of data such as IoT (Internet of Things), MTC (Machine Type Communication), M2M (Machine To Machine) or the like is performed. The demand for D2D (Device To Device) and V2V (Vehicular To Vehicular) communication, which requires low-delay communication, is also increasing.

Reduction of communication delay (latency reduction) is being studied in order to provide sufficient communication services in such future radio communication systems. For example, a study is in progress to make the transmission time intervals (TTIs), which are the minimum unit of scheduling, shorter than the one-ms TTIs of existing LTE systems (LTE Rel. 8 to 12), and communicate by using these TTIs (may be referred to as, for example, "shortened TTIs").

Although, in existing LTE systems, the timing of communication is controlled on a per subframe basis (one ms), when communication is made using shortened TTIs, how to control the timing is the problem.

The present invention has been made in view of the above points, and it is therefore an object of the present invention to provide a user terminal, a radio base station, and a radio communication method that allow appropriate timing control even when shortened TTIs are used.

Solution to Problem

One aspect of the user terminal of the present invention provides a user terminal that communicates using a shortened transmission time interval (TTI), in which the TTI duration is shorter than one ms, and that has a receiving section that receives a DL signal transmitted from the radio base station, and a control section that controls transmission of a UL signal based on the DL signal, and, in this user terminal, the control section controls a random access procedure based on the shortened TTI and/or a normal TTI having a TTI duration of one ms.

Advantageous Effects of Invention

According to the present invention, timing control can be appropriately performed even when shortened TTIs are used.

BRIEF DESCRIPTION OF DRAWINGS

FIG. 2 is a diagram to explain normal TTIs and shortened TTIs;

FIG. 4A to FIG. 4C are diagrams to show examples of configuration of normal TTIs and shortened TTIs;

FIG. 5A to FIG. 5C are diagrams to show examples of the TA timer counting method according to a first example;

FIG. 7A and FIG. 7B are diagrams to show examples of random access procedures according to a second example;

FIG. 8A and FIG. 8B are diagrams to show other examples of random access procedures according to the second example;

FIG. 9A and FIG. 9B are diagrams to show other examples of random access procedures according to the second example;

FIG. 14 is a diagram to show an example of transient period configuration method in LAA;

DESCRIPTION OF EMBODIMENTS

Figure 1:
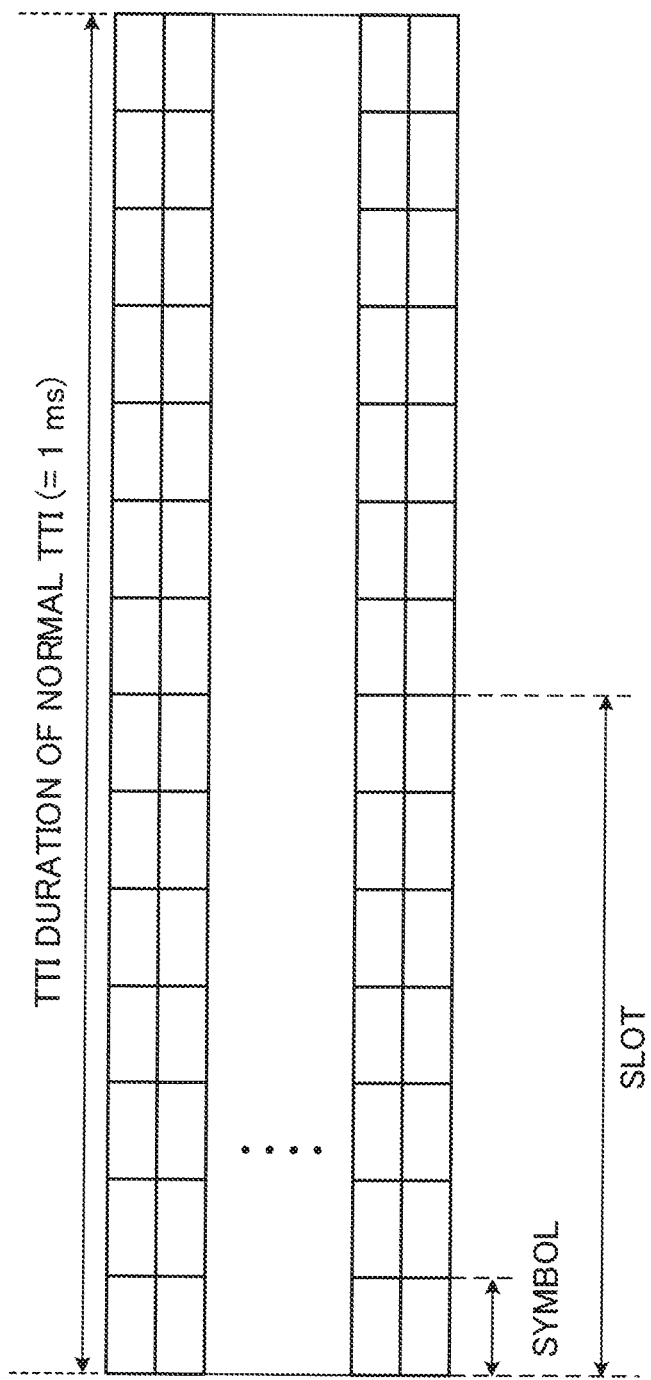
FIG. 1 is a diagram to show an example of transmission time intervals (TTIs) in existing LTE systems (Rel. 8 to 12)

FIG. 1 is a diagram to explain an example of transmission time intervals (TTIs) in existing systems (LTE Rel. 8 to 12). As shown in FIG. 1, a TTI in LTE Rel. 8 to 12 (hereinafter referred to as a "normal TTI") has a time duration of one ms. A normal TTI is also referred to as a "subframe," and is comprised of two time slots. A TTI is one channel-coded data packet (transport block) transmission time unit, and is the processing unit in scheduling, link adaptation, etc.

As shown in FIG. 1, when normal cyclic prefixes (CPs) are used in the downlink (DL), a normal TTI includes 14 OFDM (Orthogonal Frequency Division Multiplexing) symbols (seven OFDM symbols per slot). Each OFDM symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration is 66.7 μs.

Also, when normal cyclic prefixes (CPs) are used in the uplink (UL), a normal TTI is configured to include 14 SC-FDMA (Single Carrier Frequency Division Multiple Access) symbols (seven SC-FDMA symbols per slot). Each SC-FDMA symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Incidentally, when enhanced CPs are used, a normal TTI may include 12 OFDM symbols (or 12 SC-FDMA symbols). In this case, each OFDM symbol (or each SC-FDMA symbol) has a time duration of 66.7 μs, and an enhanced CP of 16.67 μs is appended.

On the other hand, in future radio communication systems such as Rel. 13 and later LTE and 5G, a radio interface that is suitable for high frequency bands such as several tens of GHz or the like and a radio interface that minimizes delay for IoT (Internet of Things), MTC (Machine Type Communication), M2M (Machine To Machine), D2D (Device To Device) and V2V (Vehicular To Vehicular) services are in demand.

Therefore, in future communication systems, it may be possible that communication is performed using shortened TTIs, which are TTIs shorter than one ms (see FIG. 2). FIG. 2 shows a cell (CC #1) using normal TTIs (one ms) and a cell (CC #2) using shortened TTIs. Also, when shortened TTIs are used, it may be possible to change the subcarrier period from the subcarriers of normal TTIs (for example, the subcarrier period may be expanded).

When TTIs of a shorter time length than normal TTIs (hereinafter referred to as "shortened TTIs") are used, the time margin for processing (for example, encoding and decoding) in the user terminal and the radio base station increases, so that the processing delay can be reduced. Also, when shortened TTIs are used, it is possible to increase the number of user terminals that can be accommodated per unit time (for example, one ms). Below, the configuration of shortened TTIs and so on will be explained.

(Configuration Example of Shortened TTIs)

A configuration example of shortened TTIs will be described with reference to FIG. 3. As shown in FIG. 3A and FIG. 3B, shortened TTIs have a time duration (TTI duration) shorter than one ms. A shortened TTI may be one TTI duration or multiple TTI durations, whose multiples are one ms, such as 0.5 ms, 0.25 ms, 0.2 ms and 0.1 ms, for example. Alternatively, when normal CPs are used, a normal TTI contains 14 symbols, so that one TTI duration or multiple TTI durations, whose multiples are integral multiples of $1/14$ ms, such as $7/14$ ms, $4/14$ ms, $3/14$ ms and $1/14$ ms, may be used. Also, when enhanced CPs are used, a normal TTI contains 12 symbols, so that one TTI duration or multiple TTI durations, whose multiples are integral multiples of $1/12$ ms, such as $6/12$ ms, $4/12$ ms, $3/12$ ms and $1/12$ ms, may be used. Also in shortened TTIs, similar to conventional LTE, whether to use normal CPs or use enhanced CPs can be configured with higher layer signaling such as broadcast information and RRC signaling. By this means, it is possible to introduce shortened TTIs, while maintaining compatibility (synchronization) with one-ms normal TTIs.

Figure 3A:
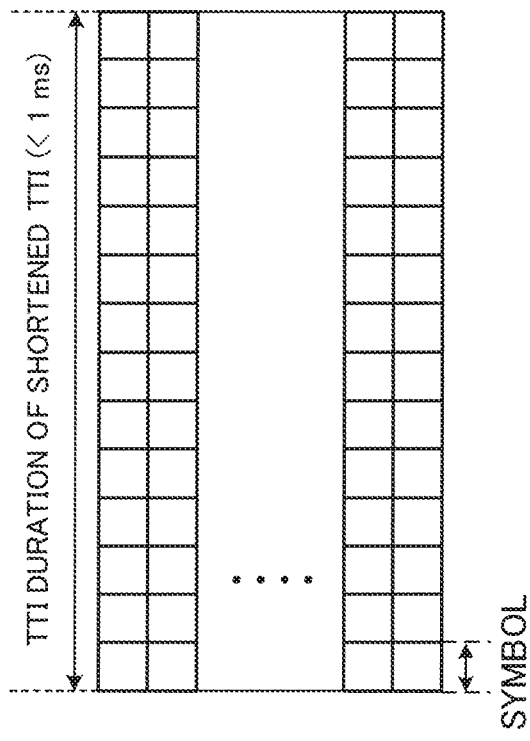
FIG. 3A and FIG. 3B are diagrams to show examples of configuration of shortened TTIs.
Figure 3B:
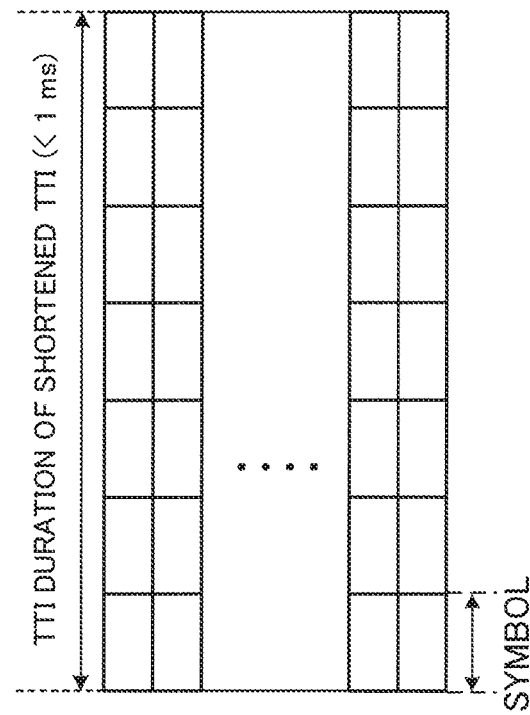

Note that, although FIG. 3A and FIG. 3B illustrate example cases of using normal CPs, the present invention is not limited to these. A shortened TTI needs only be a shorter time duration than a normal TTI, and the number of symbols in the shortened TTI, the duration of symbols, the duration of CPs and suchlike configurations can be determined freely. Also, although examples will be described below in which OFDM symbols are used in the DL and SC-FDMA symbols are used in the UL, the present invention is not limited thereto.

FIG. 3A is a diagram to show a first configuration example of shortened TTIs. As shown in FIG. 3A, in the first configuration example, a shortened TTI is comprised of 14 OFDM symbols (or SC-FDMA symbols), which is equal in number to a normal TTI, and each OFDM symbol (each SC-FDMA symbol) has a symbol duration shorter than the symbol duration (=66.7 μs) of the normal TTI.

As shown in FIG. 3A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in a normal TTI. On the other hand, since the symbol time duration differs from that of normal TTI symbols, it is difficult, as shown in FIG. 2A, to frequency-multiplex a signal with shortened TTIs and a signal with normal TTIs in the same system band (or the cell, the CC, etc.).

Also, since the symbol duration and the subcarrier period are each the reciprocal of the other, as shown in FIG. 3A, when shortening the symbol duration, the subcarrier period is wider than the 15-kHz subcarrier period of normal TTIs. When the subcarrier period becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively suppressed by expanding the subcarrier period.

FIG. 3B is a diagram to show a second configuration example of a shortened TTI. As shown in FIG. 3B, according to the second configuration example, a shortened TTI is comprised of a smaller number of OFDM symbols (or SC-FDMA symbols) than a normal TTI, and each OFDM symbol (each SC-FDMA symbol) has the same symbol duration (=66.7 µs) as a normal TTI. In this case, the shortened TTI can be configured using symbol units in a normal TTI. For example, a shortened TTI can be formed by using some of the 14 symbols included in one subframe. In FIG. 3B, a shortened TTI is comprised of seven OFDM symbols (SC-FDMA symbols), which is half of a normal TTI.

As shown in FIG. 3B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing delay can be shortened. Also, since the shortened-TTI signal shown in FIG. 3B and a normal-TTI signal can be frequency-multiplexed within the same system band (or the cell, the CC, etc.), compatibility with normal TTIs can be maintained.

(Example of Configuration of Shortened TTI)

An example of the configuration of shortened TTIs will be described. When shortened TTIs are used, it is also possible to configure both normal TTIs and shortened TTIs in a user terminal in order to have compatibility with existing systems (LTE Rel. 8 to 12). FIG. 4 show an example of the configuration of normal TTIs and shortened TTIs. Note that FIG. 4 are merely examples, and these are by no means limiting.

FIG. 4A is a diagram to show an example of the first configuration of shortened TTIs. As shown in FIG. 4A, normal TTIs and shortened TTIs may coexist in time in the same component carrier (CC) (frequency domain). Specifically, shortened TTIs may be configured in specific subframes (or specific radio frames) of the same CC. For example, in FIG. 4A, shortened TTIs are configured in five consecutive subframes in the same CC, and normal TTIs are configured in the other subframes. For example, as specific subframes, subframes that can be configured as MBSFN subframes, or subframes that include (or do not include) specific signals such as the MIB or synchronization channels may be used. The number and positions of subframes where shortened TTIs are configured are not limited to those shown in FIG. 4A.

FIG. 4B is a diagram to show an example of a second configuration of shortened TTIs. Carrier aggregation (CA) or dual connectivity (DC) may be performed by integrating CCs with normal TTIs and CCs with shortened TTIs, as shown in FIG. 4B. Specifically, shortened TTIs may be configured in specific CCs (more specifically in the DL and/or the UL of particular CCs). For example, in FIG. 4B, shortened TTIs are configured in the DL of a particular CC and normal TTIs are configured in the DL and UL of another CC. Note that the number and locations of CCs where shortened TTIs are configured are not limited to those shown in FIG. 4B.

In the case of CA, shortened TTIs may also be configured in specific CCs (the primary (P) cell and/or secondary (S) cells) of the same radio base station. On the other hand, in the case of DC, shortened TTIs may be configured in specific CCs (P cell and/or S cells) in the master cell group (MCG) formed by the first radio base station, or shortened TTIs may be configured in specific CCs (primary secondary (PS) cells and/or S cells) in a secondary cell group (SCG) formed by a second radio base station.

FIG. 4C is a diagram to show an example of a third configuration of shortened TTIs. As shown in FIG. 4C, shortened TTIs may be configured in either the DL or the UL. For example, in FIG. 4C, a case is shown in which, in a TDD system, normal TTIs are configured in the UL and shortened TTIs are configured in the DL.

Also, specific DL or UL channels or signals may be assigned to (configured in) shortened TTIs. For example, an uplink control channel (PUCCH: Physical Uplink Control Channel) may be allocated to normal TTIs, and an uplink shared channel (PUSCH: Physical Uplink Shared Channel) may be allocated to shortened TTIs. In this case, for example, the user terminal transmits the PUCCH in normal TTIs and transmits the PUSCH in shortened TTIs.

Also, a multiple-access scheme that is different from OFDM (or SC-FDMA), which is the multiple-access scheme of LTE Rel. 8 to 12, may be assigned to (configured in) shortened TTIs.

(Example of Reporting of Shortened TTIs)

As mentioned above, when cells using shortened TTIs are configured in a user terminal, the user terminal can configure (and/or detect) the shortened. Ills based on implicit or explicit reporting from the radio base station. Hereinafter, as examples of shortened TTI reporting applicable to this embodiment, a case of (1) implicit reporting, or cases of using at least one of (2) broadcast information or RRC (Radio Resource Control) signaling, (3) MAC (Medium Access Control) signaling and (4) PHY (Physical) signaling will be described.

(1) When implicit reporting is used, the user terminal may configure shortened TTIs (including, for example, judging that the communicating cell, channel, signal, etc. are shortened TTIs) based on the frequency band (for example, a band for 5G, an unlicensed band, etc.), the system bandwidth (for example, 100 MHz, etc.), whether or not LBT (Listen Before Talk) is employed in LAA (License Assisted Access), the type of data to be transmitted (for example, control data, voice, etc.), the logical channel, transport block, RLC (Radio Link Control) mode, C-RNTI (Cell-Radio Network Temporary Identifier) and the like.

Also, when control information (DCI) addressed to the subject terminal is detected in a PDCCH mapped to the first one, two, three or four symbols of a normal TTI and/or in a one-ms EPDCCH, the user terminal may judge that the one ms where the PDCCH/EPDCCH are included is a normal TTI, and, when control information (DCI) addressed to the subject terminal is detected in a PDCCH/EPDCCH configured otherwise (for example, a PDCCH mapped to symbols other than the first one to four symbols in a normal TTI and/or an EPDCCH that is less than one ms), the user terminal may then judge that a predetermined time period including the PDCCH/EPDCCH is a shortened TTI. Here, the control information (DCI) addressed to the subject terminal can be detected based on the CRC check result of blind-decoded DCI.

(2) When broadcast information or RRC signaling is used, shortened TTIs may be configured based on configuration information reported from the radio base station (for example, a first cell) to the user terminal by broadcast information or RRC signaling. The configuration information indicates, for example, information on CCs and/or subframes using shortened TTIs, information on channels and/or signals using shortened TTIs, Information on TTI duration of shortened TTI, etc. The user terminal configures shortened TTIs semi-statically based on the configuration information from the radio base station. Note that mode switching between shortened TTIs and normal TTIs may be performed in the RRC reconfiguration step or may be performed in intra-cell handover (HO) in P cells or in the removal/addition steps of CCs (S cells) in S cells.

(3) When MAC signaling is used, shortened TTIs that are configured based on configuration information reported through RRC signaling may be activated or deactivated by MAC signaling. Specifically, the user terminal activates or de-activates shortened TTIs based on MAC control elements from the radio base station. The user terminal may be preconfigured with a timer indicating the activation period of shortened TTIs by way of higher layer signaling such as RRC signaling, and shortened TTIs may be de-activated if, after shortened TTIs are activated by an L2 control signal, there is no UL/DL allocation in shortened TTIs for a predetermined period. This shortened TTI deactivation timer may count normal TTIs (one ms) as units, or count shortened TTIs (for example, 0.25 ms) as units.

Note that when the mode is switched between shortened TTIs and normal TTIs in an S cell, the S cell may be de-activated once, or it may be possible to consider that the TA (Timing Advance) timer has expired. By this means, it is possible to provide a non-communicating period when switching the mode.

(4) When PHY signaling is used, shortened TTIs that are configured based on configuration information reported by RRC signaling may be scheduled by PHY signaling. Specifically, the user terminal detects shortened TTIs based on information included in a downlink control channel that is received and detected (PDCCH (Physical Downlink Control Channel) or EPDCCH (Enhanced Physical Downlink Control Channel) (hereinafter referred to as "PDCCH/EPDCCH").

For example, it is assumed that control information (DCI) for assigning transmission or reception in normal TTIs and shortened TTIs includes different information elements, and, (4-1) when the user terminal detects control information (DCI) including an information element that assigns transmission and reception in shortened TTIs, the user terminal identifies a predetermined time period including the timing where the PDCCH/EPDCCH is detected as a shortened TTI. The user terminal can blind-decode control information (DCI) for assigning transmission or reception in both normal TTIs and shortened TTIs in the PDCCH/EPDCCH. Alternatively, (4-2) when the user terminal detects control information (DCI) including an information element that assigns transmission/reception in shortened TTIs, the user terminal may identify a predetermined time period, in which the timing the PDSCH or the PUSCH scheduled by the PDCCH/EPDCCH (downlink control information (DCI) communicated in the PDCCH/EPDCCH) is transmitted/received is included, as a shortened TTI. Alternatively, (4-3) when a user terminal detects DCI including an information element that assigns transmission/reception in shortened TTIs, the user terminal may identify a predetermined time period, in which the timing to transmit or receive retransmission control information for the PDSCH or the PUSCH scheduled by the PDCCH/EPDCCH (DCI communicated in the PDCCH/EPDCCH) is included, as a shortened TTI.

Further, the user terminal may detect shortened TTIs based on the state of the user terminal (for example, the idle state or the connected state). For example, if the user terminal is in the idle state, the user terminal may identify all the TTIs as normal TTIs and blind decode only the PDCCHs included in the first to fourth symbols of the normal TTIs of one ms. Also, if the user terminal is in the connected state, the user terminal may configure (and/or detect) shortened TTIs based on the reporting of at least one of (1) to (4) described above as examples.

As described above, in future radio communication, it is assumed that communication is performed by applying shortened TTIs, which are transmission time intervals reduced shorter than normal TTIs, to UL transmission and/or DL transmission. On the other hand, in existing LTE systems, the timing of communication is controlled on a per subframe (one ms) basis. Therefore, when communicating using shortened TTIs, how to control timing is the problem.

Therefore, as one aspect of the present invention, the inventors of the present invention have come up with an idea of performing timing control based on predetermined TTIs (or predetermined TTI duration) when communicating using shortened TTIs. The predetermined TTIs may be shortened TTIs or anti/or normal TTIs having a TTI duration of one ms.

The timing control here may include the TA timer control, the random access procedures, etc. performed by the user terminal. The random access procedures include the receiving operation of downlink control information (message 0), the transmission operation of a random access preamble (message 1), the receiving operation of a random access response (message 2), and the like. Of course, the timing control of the present embodiment is not limited to these.

Further, the inventors of the present invention have come up with an idea of controlling UL transmission timing by configuring shortened TTI cells (CCs) in timing advance groups (TAGs) that are configured when carrier aggregation (UL-CA) is applied. In this case, it is possible to adopt a configuration that does not allow UL-CA using different TTIs within the same TAG, or a configuration that allows UL-CA using different TTIs even within the same TAG.

Now, the present embodiment will be described below in detail. In the following description, the case where shortened TTIs are set to 0.5 ms, which is shorter than one ms, will be described as an example, but the applicable shortened TTI durations and the types of shortened TTI durations are not limited to this. One-ms TTIs may be referred to as "regular TTIs," "normal TTIs," "long TTIs," "regular subframes," "normal subframes," or "long subframes." TTIs that are shorter than normal TTIs may be referred to as "shortened TTIs," "short TTIs," "shortened subframes," or "short subframes."

In the following description, an LTE system will be shown as an example, but the present embodiment is not limited to this, and any system can be applied as long as it uses shortened TTIs. Further, the present embodiment is not limited to configurations in which shortened TTIs are used, and can also be applied to configurations in which transmission timings do not match (that is, shift) among a plurality of CCs. A plurality of embodiments described below may be implemented individually or in combination as appropriate.

FIRST EXAMPLE

The first example will describe how to control a TA timer control when shortened TTIs are configured. A TA timer may be referred to as a "TAT," a "timing advance timer," or a "time alignment timer."

In existing LTE systems (Rel. 12 or earlier versions), a TA timer for use for uplink synchronization (sync) and asynchronization (unsync) control is configured in cells (CCs). The TA timer is a timer that measures the time in which MAC control elements including TA commands are not received (in other words, the time since a MAC control element including a TA command was last received). TA commands are commands to indicate uplink channel transmission timing values and are included in MAC control elements. TA commands are signaled via the MAC layer from the radio base station to the user terminal.

When the TA timer expires (when the time measured by the TA timer continues for a predetermined period of time or longer), the uplink resources reserved for the user terminal are released, and uplink channel transmission is stopped. Incidentally, the TA timer is started (initialized) every time a TA command is received. In cells where the TA timer has not expired, the user terminal can perform UL transmission (transmission of the PUCCH, the PUSCH, the uplink measurement reference signal (SRS), etc.). On the other hand, in cells where the TA timer has expired, the user terminal is limited from making UL transmission other than transmitting the random access preamble (PRACH).

That is, the user terminal controls UL transmission in each cell based on the TA timer configured therein, and does not make transmission other than PRACH transmission in cells where the TA timer has expired. In existing systems, when a TA timer is configured in a user terminal, the TA timer counts time per predetermined subframe. The predetermined subframes may be all subframes in a cell or subframes in which the downlink control channel (for example, the PDCCH) can be configured (also referred to as "PDCCH subframes").

When an FDD cell is the only serving cell, the user terminal counts time for every subframe (one ms) (see FIG. 5A). FIG. 5A shows a case where the PDCCH can be scheduled in each subframe, and the user terminal controls the counting of the TA timer based on whether or not TA commands are detected in each subframe.

On the other hand, when shortened TTIs are configured, how the user terminal controls the TA timer (for example, the counting of the timer) is a problem. Here, below, an example of a method in which the user terminal controls the TA timer based on predetermined TTIs (for example, normal TTIs and/or shortened TTIs) when shortened TTI are configured will be described.

<When Normal TTIs are Used>

When shortened TTIs are configured, it may be possible that the downlink control channel (PDCCH and/or EPDCCH) is configured in each shortened TTI (see FIG. 5B). In this case, in shortened TTIs, a downlink control channel (for example, the PDCCH) that is configured also in normal TTIs and a downlink control channel that is configured in shortened TTIs but is not configured in normal TTIs are configured.

The downlink control channel that is also configured in normal TTIs may represent the conventional PDCCH that is time-multiplexed (TDM) with a downlink data period (PDSCH) and transmitted and received in the first to fourth symbols in a one-ms subframe period, and it can also represent the conventional EPDCCH that is frequency-multiplexed (FDM) with a downlink data period (PDSCH) over one ms in a one-ms subframe period and is transmitted and received. The downlink control channel that is not configured in normal TTIs but is configured only in shortened TTIs can represent a downlink control channel that can be transmitted and received from a symbol other than the first to fourth symbols in a one-ms subframe period (for example, the eighth symbol in a one-ms subframe period), over one symbol minimum, and up to the last symbol in the one-ms subframe period at a maximum. In the following description, the downlink control channel that is configured only in shortened. TTIs will be described as the downlink control channel for shortened TTIs (shortened TTI PDCCH).

The user terminal can control the counting of the TA timer for each normal TTI, not every shortened TTI (see FIG. 5B). In this case, the user terminal can be configured so that the TA timer counts time for every subframe corresponding to normal TTIs (or for every subframe in which a downlink control channel is scheduled in normal TTIs), without taking shortened-TTI subframes in consideration. Thus, the user terminal controls the counting of the TA timer based on normal TTIs, irrespective of the TTI duration in the communicating cell (CC), so that it is possible to control the TA timer regardless of whether or not shortened TTIs are configured and dynamic control is applied. As a result, the base station can easily manage the TA timers of various user terminals.

In this case, MAC control elements including TA commands may not be transmitted/received in a downlink shared channel (for example, the PDSCH) scheduled by the downlink control channel for shortened TTIs. That is, the user terminal assumes that MAC control elements including TA commands are received only in the PDSCH scheduled by the downlink control channel for normal TTIs, and the TA timer is reset when a MAC control element including a TA command is received in the PDSCH scheduled by the downlink control channel for normal TTIs. In this case, it is possible to easily manage the TA timer by matching the start timing of one-ms subframe periods and the reset timing of the TA timer.

Alternatively, MAC control elements including TA commands may be transmitted and received also in the PDSCH scheduled by the downlink control channel for shortened TTIs. That is, the user terminal assumes that MAC control elements including TA commands are received only in the PDSCH scheduled by the downlink control channel for normal TTIs, and the TA timer is reset when a MAC control element including a TA command is received in the PDSCH scheduled by the downlink control channel for normal TTIs. In this case, it is possible to easily manage the TA timer by matching the start timing of one-ms subframe period s and the reset timing of the TA timer.

<When Shortened TTIs are Used>

When shortened TTIs are configured, the user terminal may be configured so that the TA timer counts shortened TTIs as units (see FIG. 5C). In this case, it is possible to control the counting of the TA timer in the user terminal by changing the definition of existing subframes (for example, PDCCH subframes) or by newly introducing the unit of shortened TTIs. For example, the TA timer can be configured to count a shortened TTI, where a downlink control channel and/or a downlink shared channel can be scheduled, as one unit. Alternatively, the TA timer may count all the shortened TTIs in CCs where the TA timer counting operation takes place.

In this case, MAC control elements including TA commands may not be transmitted/received in the downlink shared channel (for example, the PDSCH) scheduled by the downlink control channel for shortened TTIs. That is, the user terminal assumes that MAC control elements including TA commands are received only in the PDSCH scheduled by the downlink control channel for normal TTIs, and, when a MAC control element including a TA command is received in the PDSCH scheduled by the downlink control channel for normal TTIs, the TA timer is reset. In this case, it is possible to easily manage the TA timer by matching the start timing of one-ms subframe periods with the reset timing of the TA timer.

Alternatively, MAC control elements including TA commands may be transmitted and received in the PDSCH scheduled by the downlink control channel for shortened TTIs. That is, the user terminal assumes that MAC control elements including TA commands are received in the PDSCH scheduled by either the normal TTI downlink control channel or the shortened TTI downlink control channel, and, even when a MAC control element including a TA command is received in the PDSCH scheduled by either the normal TTI downlink control channel or the shortened TTI downlink control channel, the TA timer is reset. In this case, since the opportunities to transmit and receive TA commands can be increased, the timing control can be flexibly performed.

Thus, by controlling the counting of the TA timer based on shortened TTIs that are configured, it is possible to make the TA timer of the user terminal expire earlier. As a result, power consumption can be reduced when the user terminal transmits a small amount of UL data.

<Reporting of TTIs to Use>

Alternatively, which TTIs the counting of the TA timer is based on may be reported (configured) from the radio base station to the user terminal. For example, the radio base station reports information about the TTIs to be used as units to be counted by the TA timer to the user terminal by higher layer signaling (RRC signaling, broadcast information, etc.). The user terminal controls the counting of the TA timer based on the TTI duration configured by higher layer signaling. This makes it possible to flexibly configure the units to be counted by the TA timer based on the communication environment (for example, the amount of data in the user terminal, etc.) even when shortened TTIs are configured.

SECOND EXAMPLE

The second example will describe how to control the random access procedures when shortened TTIs are configured.

In LTE systems (Rel. 8 to 12), random access procedures for allowing the user terminal to make initial connection, establish synchronization, resume communication and so on are supported. In random access procedures, for example, operations in which the user terminal transmits a physical random access channel (PRACH) and receives a random access response to the PRACH (also referred to as "RA response," "RAR," etc.) are prescribed.

Random access can be classified into two types—namely, contention-based random access (CBRA) and non-contention-based random access (non-CBRA). Note that non-contention-based RA may be also referred to as "contention-free RA" (CFRA).

In contention-based random access, the user terminal transmits a preamble, selected randomly from a plurality of random access preambles (contention preambles) prepared within a cell, by using the PRACH. In non-contention-based random access, the user terminals transmit a UE-specific random access preamble (dedicated preamble), which is assigned by the network in advance, by using the PRACH. In this case, contention is not created because different random access preambles are allocated between user terminals.

Figure 6:
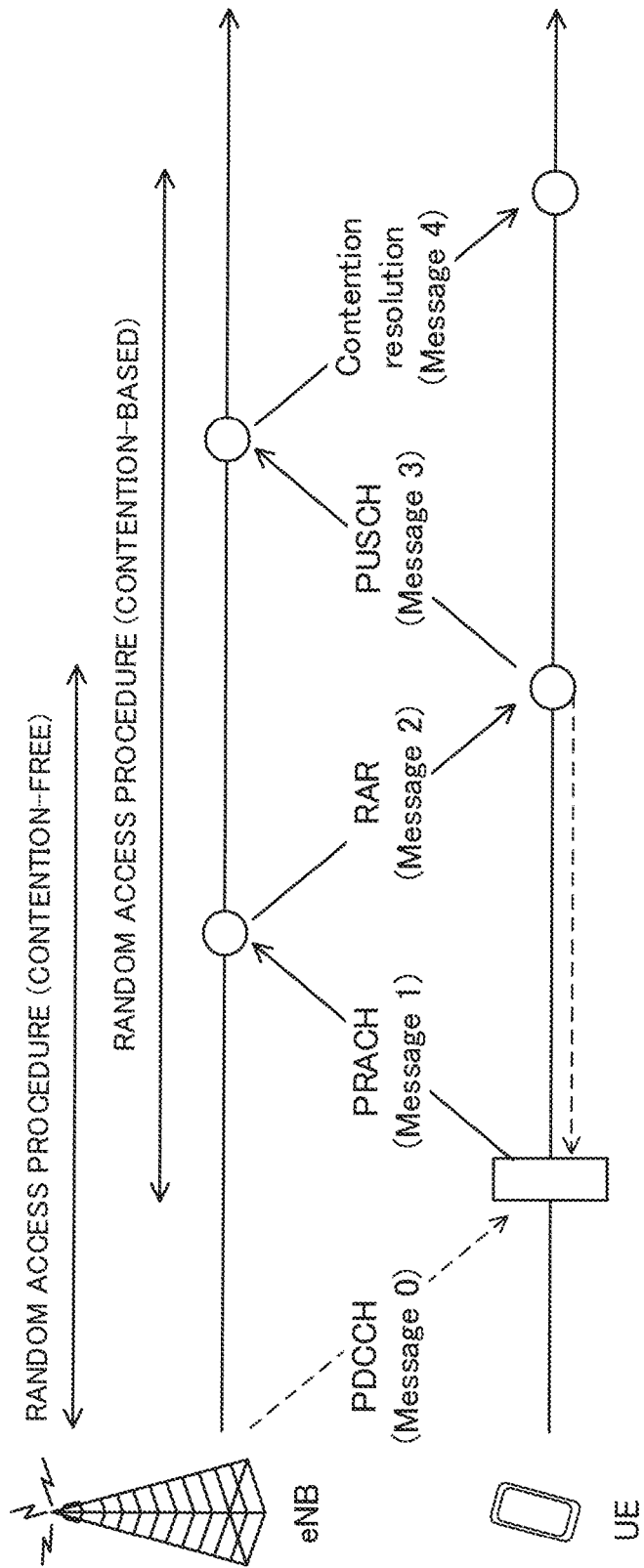
FIG. 6 is a diagram to show an example of random access procedures.

Contention-based random access is used when establishing initial connection, when starting or resuming uplink communication, and so on. Non-contention-based random access is used when conducting a handover, when starting or resuming downlink communication, and so on. FIG. 6 shows an overview of random access. Contention-based random access is comprised of step 1 to step 4, and non-contention-based random access is comprised of step 0 to step 2.

In contention-based random access, first, the user terminal UE transmits a random access preamble (PRACH) by using the PRACH resource that is configured in the residing cell (message (Msg) 1). A radio base station eNB, upon detecting the random access preamble, transmits a random access response (RAR) in response to that (message 2). After having transmitted the random access preamble, the user terminal UE tries to receive message 2 for a predetermined period. When the user terminal UE fails to receive message 2, the user terminal UE raises the transmission power of the PRACH and transmits (retransmits) message 1 again. Note that increasing the transmission power when retransmitting signals is also referred to as "power ramping."

The user terminal UE that has received the random access response transmits the data signal using the physical uplink shared channel (PUSCH) specified by the uplink grant included in the random access response (message 3). The radio base station eNB, upon receiving message 3, transmits a contention resolution message to the user terminal UE (message 4). The user terminal UE identifies the radio base station eNB by establishing synchronization using messages 1 to 4, and thereupon finishes the contention-based random access procedure and establishes a connection.

In the event of contention-free random access, first, the radio base station transmits a PRACH transmission-commanding physical downlink control channel (PDCCH-order) to the user terminal UE (message 0). The user terminal UE transmits a random access preamble (PRACH) at the timing specified by PDCCH (message 1). The radio base station eNB, upon detecting the random access preamble, transmits a random access response (RAR), which is information in response to that (message 2). The user terminal finishes the non-contention-based random access procedures upon receipt of message 2. Note that, as in contention-based random access, when the user terminal fails to receive message 2, the user terminal raises the transmission power of the PRACH and transmits message 1 again.

Note that the transmission of a random access preamble (message 1) using a PRACH is also referred to as the transmission of a PRACH, and the receipt of a random access response (message 2) using a PRACH is also referred as the receipt of a PRACH.

Also, when the above-mentioned TA timer is expired, the user terminal starts establishing timing in the contention-free random access procedures (PRACH transmission of PDCCH-order) based on the PDCCH.

By the way, even when shortened TTIs are used, it may be possible to apply contention-based and/or contention-free random access. When shortened TTIs are configured, how the user terminal controls the random access procedures is a problem. Here, below, an example of a method in which the user terminal controls the random access procedures (for example, messages 0 and 2) based on predetermined TTIs when shortened TTIs are configured will be described.

[Message 0]

When triggering a PRACH from the user terminal by a downlink control channel transmitted from the radio base station, the downlink control channel to trigger the PRACH is controlled based on predetermined TTIs (for example, normal TTIs and/or shortened TTIs).

<When Downlink Control Channel for Normal TTIs is Used>

For example, the PRACH trigger is controlled based on the downlink control channel (PDCCH and/or EPDCCH) transmitted in normal TTIs (one ms) irrespective of what TTI duration is configured (see FIG. 7A). In this case, only the downlink control channel to be allocated to normal TTIs is used as the PRACH-triggering downlink control channel, not the downlink control channel for shortened TTIs. That is, a configuration, in which only existing downlink control channels (PDCCH and/or EPDCCH) can be supported as PRACH-triggering PDCCHs, is used.

In this case, as shown in FIG. 7A, even if a downlink control channel to be transmitted in the middle of normal TTIs (subframes) for shortened TTIs is introduced, the PRACH is not triggered by the downlink control channel for shortened TTIs. The user terminal can control the random access procedures based on the assumption that a PRACH transmission-commanding downlink control channel is not received other than the downlink control channel allocated in normal TTIs.

Thus, regardless of the TTI duration in the communicating cell (CC), the transmission of the PRACH is controlled based on downlink control information that is transmitted at normal TTI timings, so that the transmission of the PRACH can be controlled regardless of whether or not shortened TTIs are configured, dynamic control is employed, and so on.

<When Downlink Control Channel for Shortened TTIs is Used>

When shortened TTIs are configured, the user terminal may control the PRACH trigger based on the downlink control channel transmitted. In these shortened TTIs as units (see FIG. 7B). That is, it is possible to adopt a configuration, in which the PRACH is triggered by using the downlink control channel for shortened TTIs (PDCCH and/or EPDCCH), in addition to the downlink control channel allocated to normal TTIs.

As shown in FIG. 7B, when a downlink control channel to be transmitted in the middle of normal TTIs (subframes) exclusively for shortened TTIs is introduced, the PRACH is triggered using both the downlink control channel allocated in normal TTIs and the downlink control channel for shortened TTIs. The user terminal can control the random access procedures based on the assumption that a PRACH transmission-commanding downlink control channel is also received in the downlink control channel for shortened TTIs, in addition to the downlink control channel to be allocated to normal TTIs. By this means, the user terminal can receive the PRACH-triggering downlink control channel earlier than in existing systems.

When the user terminal receives a downlink control channel to trigger the PRACH, the user terminal can transmit the PRACH using the PRACH resource (for example, the PRACH resource that is configured first) that is configured a predetermined period after the timing the downlink control channel is received.

The user terminal can transmit the PRACH using the PRACH resource that is configured a predetermined normal TTI duration after the downlink control channel is received. The predetermined normal TTI duration can be, for example, six ms. When a PRACH trigger is indicated by the downlink control channel for shortened TTIs, six ms later is not the beginning of a normal TTI but is the middle thereof. Therefore, the user terminal may perform control that the PRACH is transmitted using the PRACH resource configured at the next timing, instead of the PRACH resource corresponding to the normal subframe six ms later (see FIG. 8A).

Alternatively, the user terminal may be configured to transmit the PRACH using the PRACH resource that is configured a predetermined shortened TTI duration after the downlink control channel is received. The predetermined shortened TTI duration can be, for example, 6× shortened TTI. When a PRACH trigger is indicated by the downlink control channel for shortened TTIs, the subframe (normal TTI) after (6× shortened TTI) comes earlier than the subframe after 6 ms. Therefore, even when a PRACH trigger is indicated by the downlink control channel for shortened TTIs, the user terminal can transmit the PRACH using the PRACH resource corresponding to the normal subframe that comes 6 ms later at the latest (see FIG. 8B).

[Message 2]

The user terminal tries to receive a random access response (also referred to as "RA response," "RAR," etc.) at a predetermined time period after PRACH transmission. In this case, the RA response is controlled by using normal TTIs and/or shortened TTIs.

<Generation of RA-RNTI>

The RA response is allocated to the downlink shared channel (PDSCH), and the downlink control channel (for example, the PDCCH) to schedule this RA response-scheduling is masked with the RA identifier. The identifier for RA is also referred to as "RA-RNTI."

In existing system, the RA-RNTI is determined based on the index of the first subframe (t_id) where PRACH transmission takes place, and the frequency resource index (f_id). For example, the RA-RNTI can be determined based on following equation 1:

$$RA\text{-}RNTI = 1 + t\_id + 10 \times f\_id \qquad \text{(Equation 1)}$$

where:

t_id: 0 to 9, the subframe index of the first subframe in which PRACH transmission takes place; and f_id: 0 to 5, the frequency resource index.

According to the present embodiment, it is possible to determine the RA-RNTI by using the subframe indices of normal TTIs (for example, by using equation 1 above), irrespective of whether or not shortened TTIs are configured. That is, even when shortened TTIs are configured, the user terminal controls RA response by determining the RA-RNTI using the indices of normal TTI subframes as PRACH transmission subframes. This makes it possible to prevent collision between RA-RNTIs and user terminals (for example, existing user terminals) using normal TTIs.

<Timing to Receive RA Response>

The user terminal can receive the RA response in a predetermined period that is configured in advance. In the present embodiment, regardless of whether or not shortened TTIs are configured, the user terminal transmits an RA response within the range of a predetermined window size from the third subframe from the last PRACH-transmission subframe. The predetermined window size is also referred to as the "RA response window size." That is, the user terminal tries to receive the RA response using a downlink control channel masked with the RA-RNTI during the period of this window size, as in existing systems.

In this case, it is possible to adopt a configuration, in which the RA response is sent only in the downlink control channel (existing PDCCH and/or EPDCCH) that is also assigned to normal TTIs, not in the downlink control channel for shortened TTIs. The user terminal tries to receive the downlink control channel masked with the RA-RNTI only in existing downlink control channels during the RA response window size from the third subframe from the last-PRACH transmission subframe (see FIG. 9A). The user terminal can control the random access procedures based on the assumption that RA responses are not received in channels other than the downlink control channel to be allocated to normal TTIs.

Thus, regardless of the TTI duration in the communicating cell (CC), the reception of RA responses is controlled based on the downlink control information transmitted at normal TTI timings, so that it is possible to control the reception of RA responses regardless of whether or not shortened TTIs are configured, dynamic control is used, and so on.

Alternatively, if shortened TTIs are configured, the user terminal may try to receive RA responses using downlink control channels (downlink control channel for normal TTIs+downlink control channel for shortened TTIs) that are transmitted using shortened TTIs as units (see FIG. 9B). That is, it is possible to adopt a configuration in which RA responses are received using the downlink control channel for shortened TTIs in addition to the downlink control channel allocated to normal TTIs.

When a downlink control channel for scheduling the downlink shared channel and/or the uplink shared channel for shortened TTIs is newly introduced, it becomes possible to receive RA responses quickly by receiving RA responses during the RA response window size also in the downlink control channel.

THIRD EXAMPLE

A third example will describe how to control the timing of transmission when the user terminal configured with shortened TTIs communicates (for example, in CA and/or DC) using a plurality of CCs (cells) having different TTIs. Specifically, multiple timing advance (also referred to as "multiple TA") control when shortened TTIs are configured is explained.

In existing systems (Rel. 12), it is supported that the user terminal performs communication using multiple CCs (in CA and/or DC). In CA and DC, independent timing control (multiple TA) between CCs is supported. In multiple TA, the user terminal performs independent timing advance (TA) control between different timing advance groups (TAG). On the other hand, within the same TAG, the TA control is the same (the transmission timing is also the same).

When shortened TTIs are introduced, it is desirable to perform CA and/or DC using multiple CCs of different TTIs (for example, CCs with norm TTIs and CCs with shortened TTIs). That is, it may be possible that the user terminal performs UL-CA in CCs where UL transmission is performed using different TTIs including shortened TTIs. Therefore, it may be possible to configure TAGs including shortened TTIs. Meanwhile, in this case, the transmission timings may be different even if the transmission timings match between CCs in which UL transmission occurs in different TTIs and can be included in the same TAG (see FIG. 10).

Figure 10:
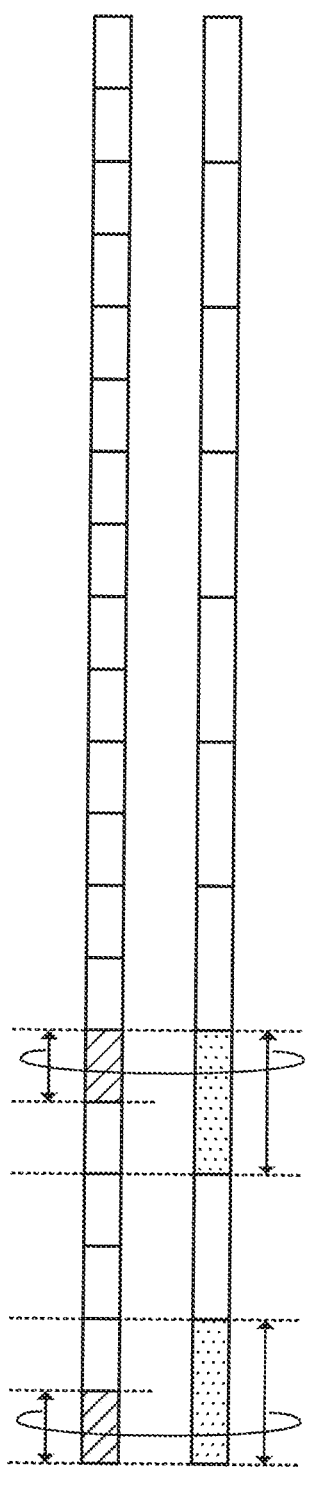
FIG. 10 is a diagram to explain transmission timings between CCs with different TTI durations.

FIG. 10 shows an example of a case in which UL transmission (UL-CA) is made using a first CC (UL #1) to which a first TTI duration (for example, one ms) is applied and a second CC (UL #2) to which a second TTI duration (for example, 0.5 ms) is applied is shown. Here, assume the case where, between the two TTIs (subframes) of the second CC overlapping the TTIs (subframes) of the first CC, the transmission-starting timing of the first-half TTI matches the transmission-starting timing of the first CC's TTI.

When UL transmission is performed separately between the TTIs of the first CC and the first-half TTI of the second CC, the transmission-starting timings match but the transmission-ending timings do not match and differ. On the other hand, when UL transmission is performed separately between the TTIs of the first CC and the second-half TTI of the second CC, the transmission-starting timings differ and do not match between the CCs, but the transmission-ending timings match.

Thus, when communicating with multiple CCs with different TTI durations using shortened TTIs, how to control timing is a problem. Therefore, below, an example of a multiple TA control method when shortened TTIs are configured will be explained.

<TAG Configuration According to TTI Duration>

Figure 11:
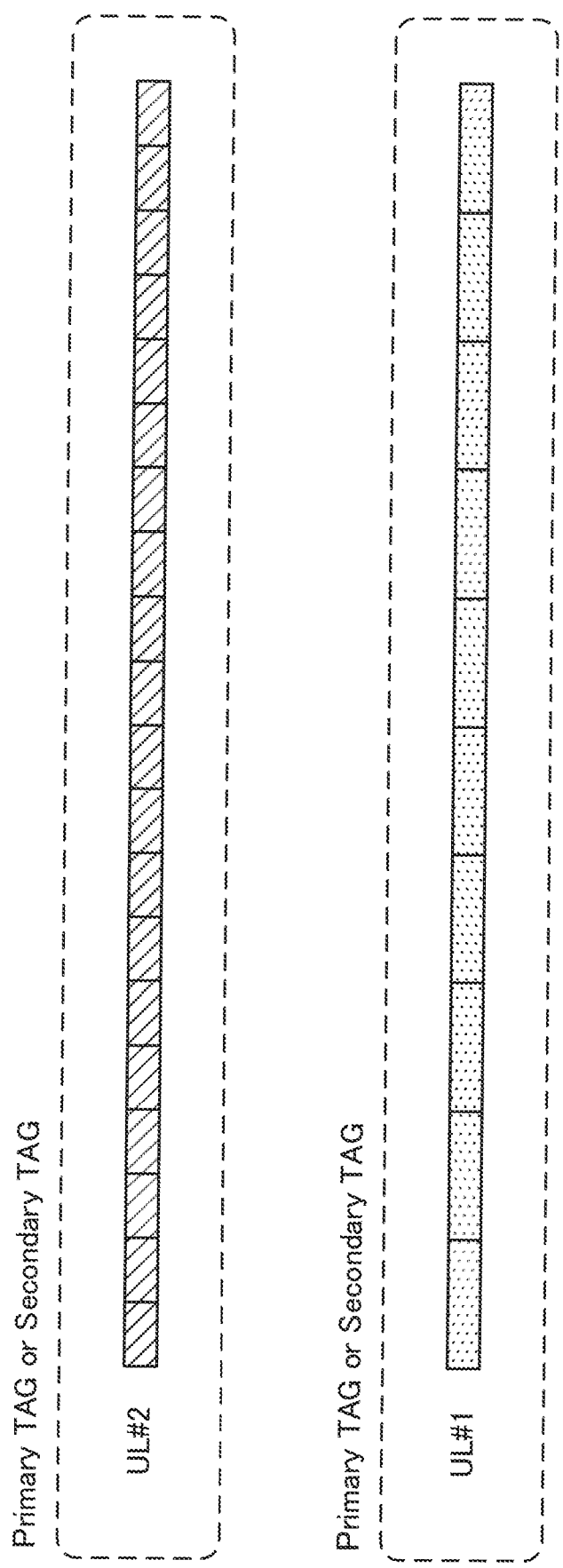
FIG. 11 is a diagram to show an example of a TAG configuration method according to a third example.

When communicating using multiple CCs with varying TTI durations, TAGs can be configured according to TTI durations. To be more specific, CCs where UL transmissions occur in different TTI durations can be configured in different TAGs (see FIG. 11). FIG. 11 shows the case where a CC (UL #1) in which normal TTIs are applied to the UL is configured in a first TAG and a CC (UL #2) in which shortened TTIs are applied to the UL is configured in a second TAG.

The user terminal can control UL transmission (multiple TA) based on the assumption that CCs where different TTI durations are applied to the UL are not included in the same TAG. In this case, a user terminal supporting UL-CA between CCs where UL transmissions of varying TTIs occur can be configured to always support multiple TA. That is, MTA capability can be essential as the capability of the user terminal that performs CA and/or DC using shortened TTIs.

When TAGs are configured according to the TTI duration applied to UL transmission, the user terminal can perform TA timer management and timing control for each TAG independently. Also, the ON/OFF time mask can be specified for each CC. The ON/OFF time mask refers to the monitoring period of the transmission ON power period and the transmission OFF power period.

Figure 12:
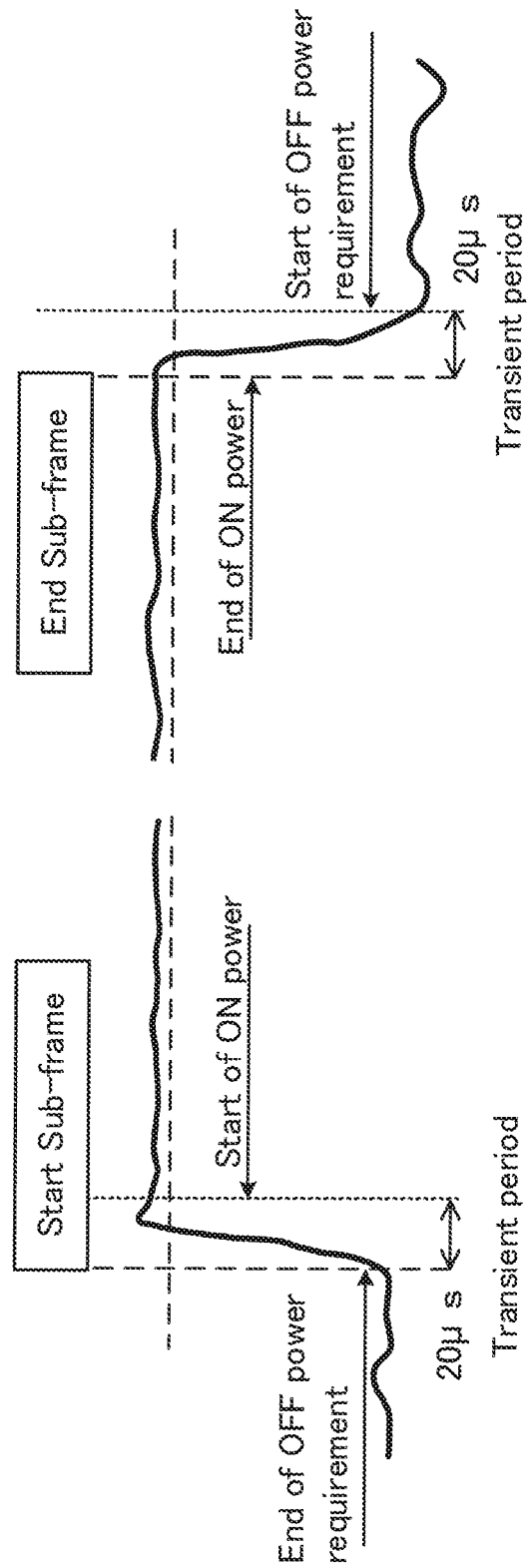
FIG. 12 is a diagram to explain ON/OFF power requirements and transient periods.

The user terminal is required to generate a transmission waveform so as to satisfy the ON/OFF power requirement and the transient period of a predetermined period for each UL transmission (CC) (see FIG. 12). For example, when transmitting a signal, the user terminal configures the power required during "ON" from the power required during "OFF" within the transient period that is configured at the beginning of the subframe, and transmits the signal (generates the transmission waveform). Also, when stopping the transmission of signals, the user terminal configures the power required during "OFF" from the power required during "ON" within the transient period which is configured at the end of the subframe, and stops the transmission. The transient period can be, for example, 20 µs.

In existing systems, transmission timings match between CCs in the same TAG and normal subframes are applied, so that a transient period does not occur during (for example, in the middle of) UL transmission taking place in a UL subframe. Meanwhile, when UL transmission is made using shortened TTIs, if the provision of existing systems is applied, the user terminal may change the UL transmission power in the middle of UL subframes (normal subframes) between CCs in the same TAG. In such a case, it is desirable to define a different transient period than existing systems.

For example, if shortened TTIs are configured, the ON/OFF power requirement required for the user terminal may be defined so that the details of the TTIs and/or the transient period are different than in normal TTIs. For example, the subframes can be shortened TTIs. Moreover, the transient period can be defined shorter compared with the transient period (20 μs) in normal TTIs.

Thus, when TAGs are configured based on the TTI duration, communication using shortened TTIs can be appropriately performed by configuring different required conditions (for example, the TTIs, the transient period, etc.) than CCs of shortened TTIs, to CCs of normal TTIs.

<When Setting TAG Regardless of TTI Duration>

Figure 13A:
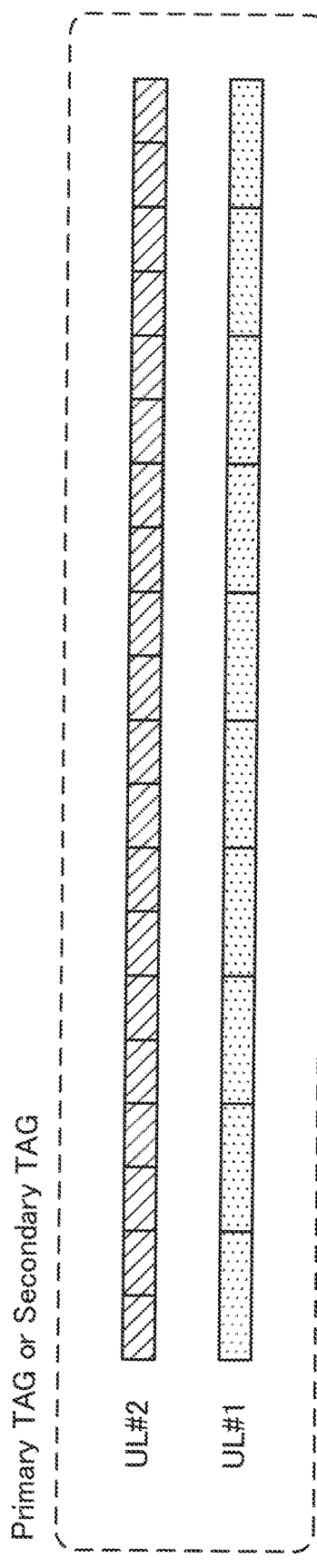
FIG. 13A and FIG. 13B are diagrams to show examples of a TAG configuration method and a transient period configuration method according to the third example.

In addition, in the present embodiment, when communication is performed using a plurality of CCs having different TTI durations, TAGs may be configured regardless of the TTI durations. In this case, the same TAG can be comprised of CCs with different UL TTI durations (see FIG. 13A). In FIG. 13A, a case where a CC (UL #1) in which normal TTIs are applied to the UL and a CC (UL #2) in which shortened TTIs are applied to the UL are configured in the same TAG is shown.

In this way, it is permitted that multiple CCs where UL transmissions of varying TTIs occur are included in the same TAG, so that, even in a case of communicating with a single radio base station or the like, it is possible for a user terminal not having the MTA function to perform communication using a plurality of CCs of varying TTIs. As a result, compared to the case where TAGs are configured according to TTI durations (when MTA is applied), it is possible to suppress complication of control on the user terminal side and to simplify the implementation of the user terminal.

The user terminal can perform TA timer management, timing control, etc. for each TAG. Further, the user terminal can generate transmission waveforms so as to satisfy the ON/OFF power requirement and the transient period of a predetermined period (for example, 20 μs) for each UL transmission (CC) (see FIG. 12).

In existing systems, since the transmission timings match between CCs in the same TAG, a transient period does not occur during (for example, in the middle of) UL transmission. Meanwhile, as shown in FIG. 13A, when CCs with different TTI durations are included in the same TAG, the transmission timings may vary (see FIG. 10 above).

Figure 13B:
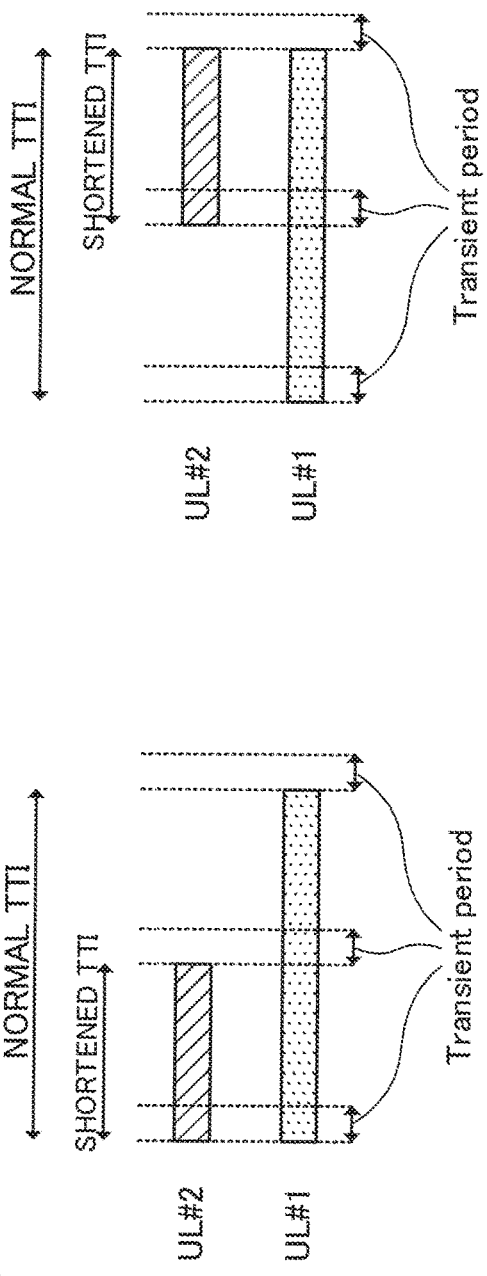

Therefore, if CCs of varying UL TTI durations are included in the same TAG, a configuration to allow a transient period to occur during (for example, in the middle of) UL transmission within the same TAG may be used (see FIG. 13B). This means that the distortion of waveform is allowed in the UL transmission period corresponding to the transient period.

For example, in FIG. 13A, a first CC (UL #1), to which a first TTI duration (for example, one ms) is applied, and a second CC (UL #2), to which a second TTI duration (for example, 0.5 ms) is applied, are configured in the same TAG. At this time, between the two shortened TTIs of the second CC overlapping the normal subframe of the first CC, the transmission-starting timing of the first-half shortened TTI coincides with the transmission-starting timing of the normal subframe of the first CC.

Meanwhile, when UL transmission is performed separately between the normal subframe of the first CC and the second-half shortened TTI of the second CC, the transmission-starting timings differ between the CC and do not match. In this case, in the first-half shortened TTI of the second CC, transmission is stopped in the middle of the normal subframe, and in the second-half shortened TTI, transmission is started in the middle of the normal subframe. Therefore, it is effective to control UL transmission on the assumption that a transient period occurs in the middle of a normal subframe (see FIG. 13B).

In this way, a transient period can be allowed to occur in the middle of UL transmission within the same TAG, so that it is possible to appropriately perform UL transmission even when CCs with different TTI durations are included in the same TAG.

<Variation>

The MTA control method described in the third example can be applied to UL-CA using license bands and unlicensed bands.

In LTE of Rel. 13 and later versions, operation in frequency bands where license is not required—that is, unlicensed bands—is also a target of study. For unlicensed bands, for example, the 2.4 GHz and/or the 5 GHz band are used as in Wi-Fi. Although carrier aggregation (LAA: license-assisted access) between licensed bands and unlicensed bands is placed under study in Rel. 13 LTE, there is a possibility that, in the future, dual connectivity and unlicensed-band stand-alone will becomes targets of study as well.

As mentioned earlier, in systems that run LTE/LTE-A in unlicensed bands (for example, LAA systems), interference control functionality is likely to be necessary in order to allow co-presence with other operators' LTE, Wi-Fi, or other different systems. Note that systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station, a user terminal and so on) that communicates by using a carrier (which may also be referred to as a "carrier frequency," or simply a "frequency") of an unlicensed band detects another entity (for example, another UE) that is communicating in this unlicensed band carrier, the transmission point is disallowed to make transmission in this carrier.

In this case, the transmission point executes listening (LBT) at a timing that is a predetermined period ahead of a transmission timing. To be more specific, by executing LBT, the transmission point searches the whole applicable carrier band (for example, one CC) at a timing that is a predetermined period ahead of a transmission timing, and checks whether or not other devices (for example, radio base stations, UEs, Wi-Fi devices and so on) are communicating in this carrier band.

Note that "listening" refers to the operation which a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), "carrier sensing" and so on. Also, it is possible to make unlicensed bands cells (CCs) to execute listening and make license bands cells not to execute listening.

The transmission point then carries out transmission using this carrier only if it is confirmed that no other devices are communicating. If the received power measured during LBT (the received power during the LBT period) is equal to or lower than a predetermined threshold, the transmission point judges that the channel is in the idle state ($LBT_{idle}$), and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another device, the transmission point stops its transmission. For example, if the transmission point detects that the received power of a signal from another device entering this band exceeds a threshold, the transmission point judges the channel is in the busy state ($LBT_{busy}$), and makes no transmission. In the event $LBT_{busy}$ is yielded, LBT is carried out again with respect to this channel, and the channel becomes available for use only after it is confirmed that the channel is in the idle state.

In LAA, the UL transmission timing in an unlicensed band where listening is executed before transmission may not coincide with the UL transmission timing of a license band. For example, if listening (LBT) performed before transmission in an unlicensed band yields $LBT_{busy}$, a case might occur where transmission is started in the middle of a subframe or transmission ends in the middle of a subframe. A subframe, in which transmission is started and/or stopped in the middle of the subframe is also referred to as a "partial subframe." That is, depending on the result of listening, there are cases where transmission is started or stopped in the middle of normal subframes like shortened TTIs.

Therefore, in UL-CA of LAA, it is possible to use a configuration in which unlicensed band UL cells are included in TAGs different from those of licensed band UL cells (see FIG. 11 above). In this case, different requirements (for example, the TTIs, the transient period, etc.) than CCs of existing systems (for example, license bands) may be configured for each TAG or CC (for example, TAGs or CCs including unlicensed bands). By doing this, communication using unlicensed bands can be performed appropriately.

Alternatively, it may be possible to allow UL cells of unlicensed bands and UL cells of license bands to be included in the same TAG (see FIG. 13A above). In this case, within the same TAG, it may be possible to allow a transient period to occur during (for example, in the middle of) UL transmission in each CC (see FIG. 14). In this way, by permitting a transient period to occur in the middle of UL transmission in the same TAG, even if CCs of license bands and unlicensed hands are included in the same TAG, UL transmission can be performed appropriately.

(Radio Communication System)

Now, the structure of the radio communication system according to an embodiment of the present invention will be described below. In this radio communication system, the radio communication methods of the above-described embodiments are employed. Note that the radio communication methods of the above-described embodiments may be applied individually or may be applied in combination.

Figure 15:
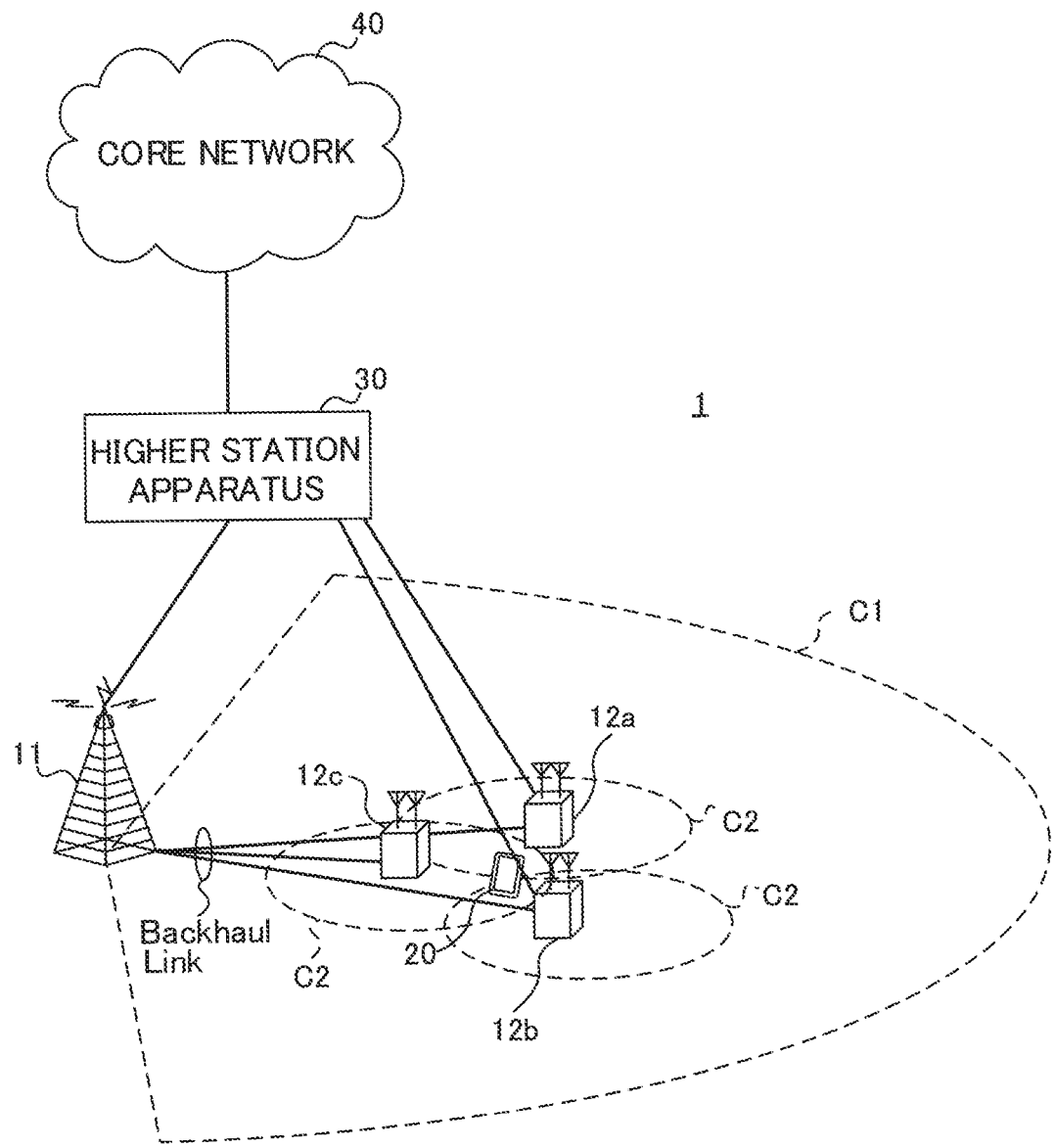
FIG. 15 is a diagram to show an example of a schematic structure of a radio communication system according to the present embodiment.

FIG. 15 is a diagram to show an example of a schematic structure of a radio communication system according to the present embodiment. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 15 includes a radio base station 11 that forms a macro cell C1, and radio base stations 12a and 12b that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) d a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pica base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 16:
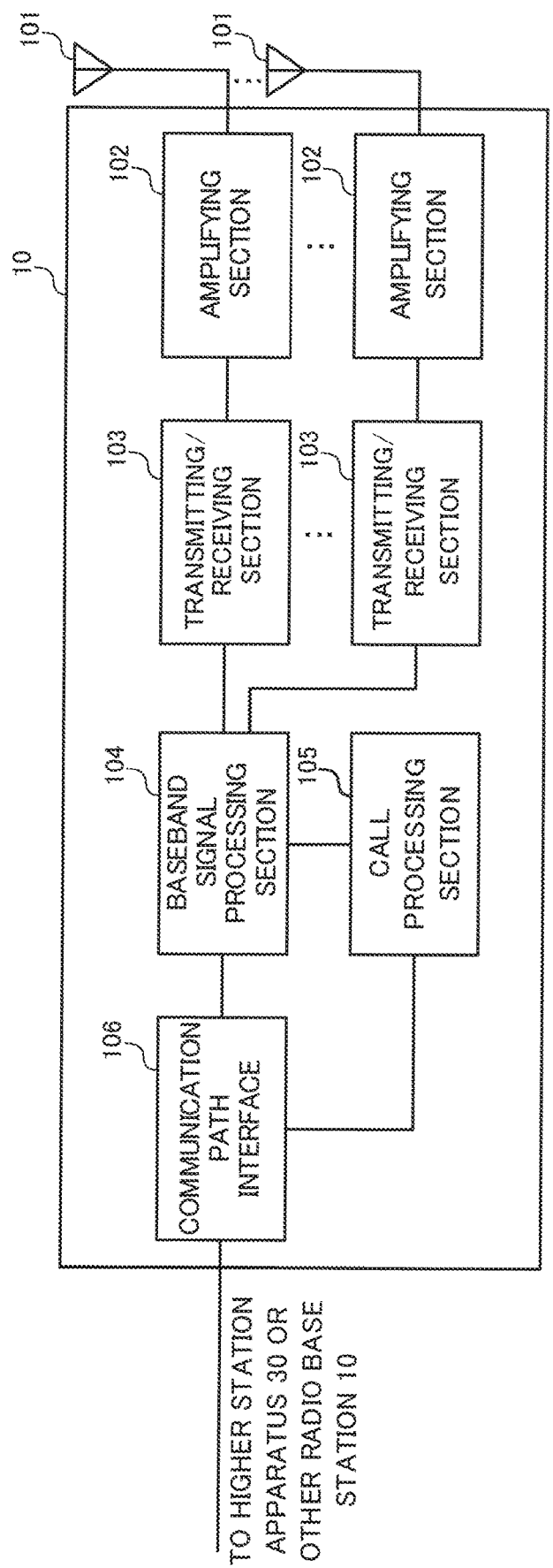
FIG. 16 is a diagram to show an example of an overall structure of a radio base station according to present embodiment.

FIG. 16 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control. MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to each transmitting/receiving sections 103.

Baseband signals that are pre-coded and output from the baseband signal processing section 104 on a per antenna basis are converted into a radio frequency band in the transmitting/receiving sections 103, and then transmitted. The radio to frequency signals having been subjected to frequency conversion in the transmitting/receiving sections 103 are amplified in the amplifying sections 102, and transmitted from the transmitting/receiving antennas 101.

The transmitting/receiving sections (transmitting sections) 103 transmit DL signals from a plurality of CCs. As DL signals, the transmitting/receiving sections (transmitting sections) 103 can transmit, for example, a random access channel transmission-commanding downlink control channel and a random access response-scheduling downlink control channel. The transmitting/receiving sections (receiving sections) 103 receive the UL signals such as the PRACH transmitted from the user terminal. Further, the transmitting/receiving sections (receiving sections) 103 receive the UL signal whose transmission timing is controlled for each TAG. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmission section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 17:
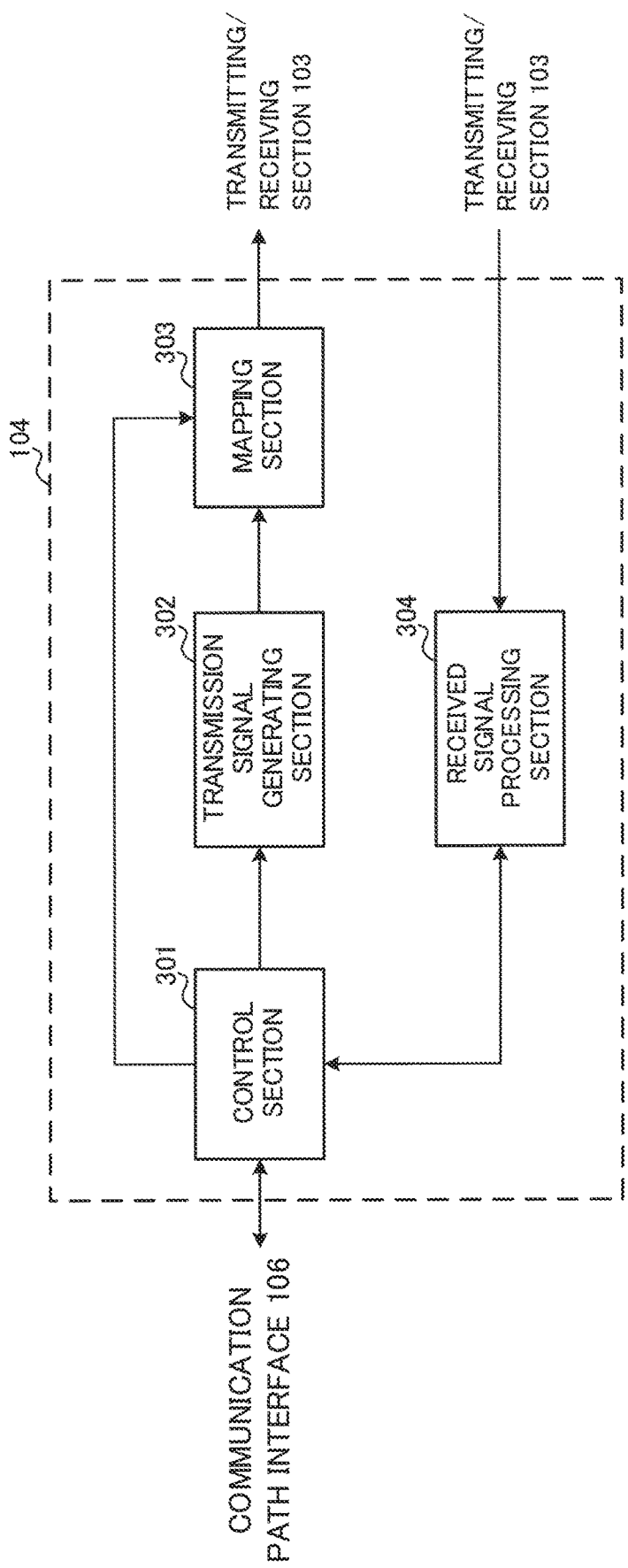
FIG. 17 is a diagram to show an example of a functional structure of a radio base station according to present embodiment.

FIG. 17 is a diagram to show an example of a functional structure of a radio base station according to the present embodiment. Note that, although FIG. 17 primarily shows functional blocks that pertain to characteristic parts of the present embodiment, the radio base station 10 has other functional blocks that are necessary for radio communication as well. As shown in FIG. 17, the baseband signal processing section 104 has a control section (scheduler) 301, a transmission signal generation section (generation section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, CRSs (Cell-specific Reference Signals), CSI-RSs (Channel State Information Reference Signals) and so on. Furthermore, the control section 301 also controls the scheduling of uplink reference signals, uplink data signals that are transmitted in the PUSCH, and uplink control signals that are transmitted in the PUCCH and/or the PUSCH.

The control section 301 transmits a PRACH transmission-commanding downlink control channel and/or an RA response-scheduling downlink control channel to the user terminal only at normal TTI transmission timings, or at both normal TTI and shortened TTI transmission timings (see FIG. 7 and FIG. 9). For the control section 301, a controller, a control circuit or a control device that can be described based on common understanding of the technical field to which the present invention pertains can be used.

The transmission signal generation section 302 generates DL signals (downlink control signals, downlink data signals, downlink reference signals and so on) based on commands from the control section 301, and outputs these signals to the mapping section 303. To be more specific, the transmission signal generation section 302 generates a downlink data signal (PDSCH) including user data, and outputs it to the mapping section 303. Further, the transmission signal generation section 302 generates a downlink control signal (PDCCH/EPDCCH) including DCI (UL grant), and outputs it to the mapping section 303. Further, the transmission signal generation section 302 generates downlink reference signals such as CRS and CSI-RS, and outputs them to the mapping section 303.

The mapping section 303 maps the downlink signals generated in the transmission signal generation section 302 to predetermined radio resources based on commands from the control section 301, and outputs these to the transmitting/receiving sections 103. For the mapping section 303, a mapper, a mapping circuit or a mapping device that can be described based on common understanding of the technical field to which the present invention pertains can be used.

The received signal processing section 304 performs the reception process (for example, demapping, demodulation, decoding, etc.) of the UL signals (HARQ-ACK, PUSCH, etc.) transmitted from the user terminal 20. The processing results are output to the control section 301. The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 18:
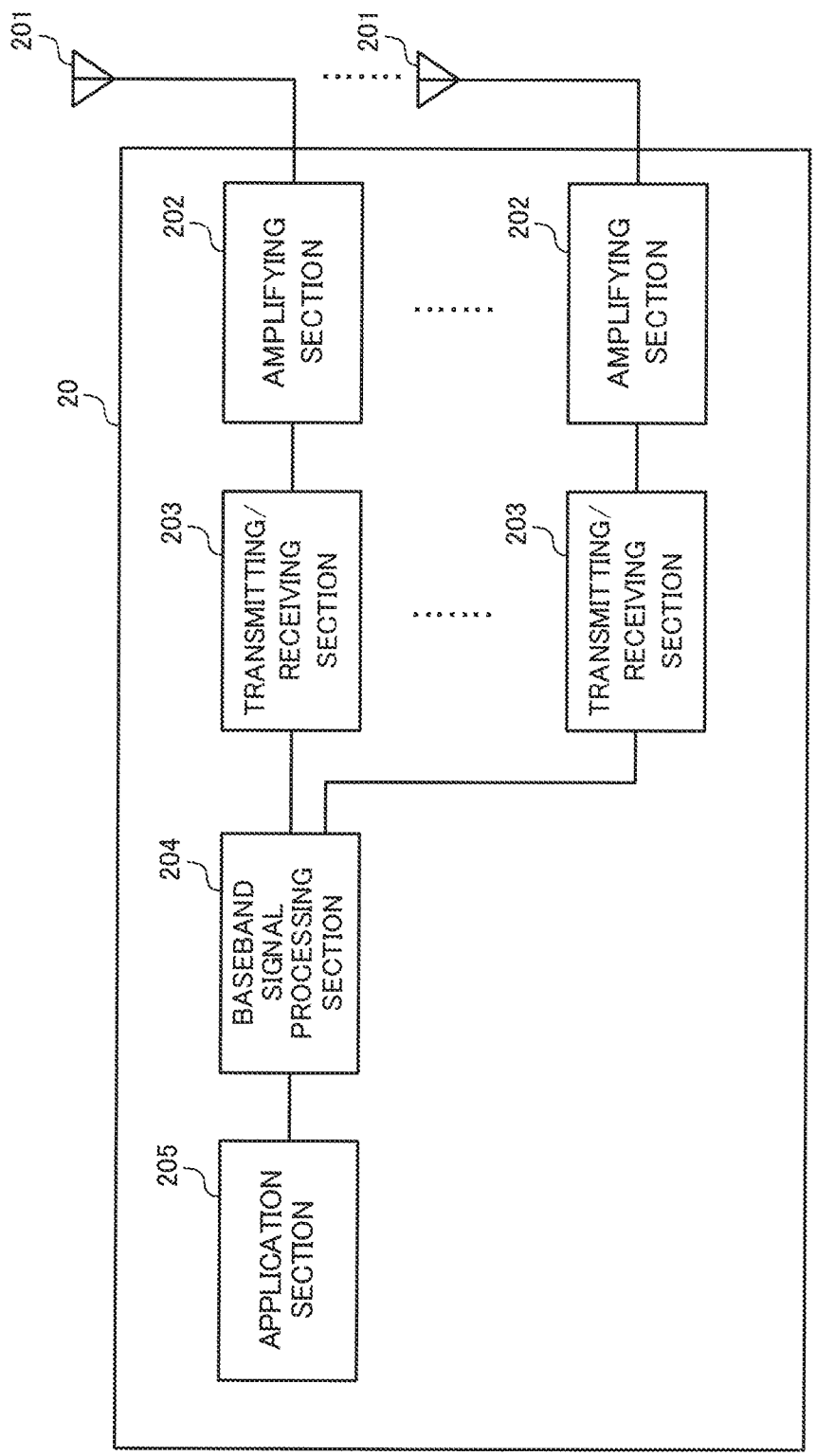
FIG. 18 is a diagram to show an example of an overall structure of a user terminal according to present embodiment.

FIG. 18 is a diagram to show an example of an overall structure of a user terminal according to an embodiment of the present invention. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving section (receiving section) 203 receives DL signals transmitted from a plurality of component carriers (CCs). Further, the transmitting/receiving section (receiving section) 203 can receive the PRACH transmission-commanding downlink control channel only at normal TTI transmission timings or at both normal TTI and shortened TTI transmission timings (see FIG. 7).

Further, the transmitting/receiving section (receiving section) 203 can try to receive RA responses based on downlink control information, to which an RA-RNTI, generated based on subframe indices of normal TTIs, is applied. Further, the transmitting/receiving section (receiving section) 203 can receive downlink control information, to which an RA-RNTI is applied, only at normal TTI transmission timings or at both normal TTI and shortened TTI transmission timings (see FIG. 9). For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 19:
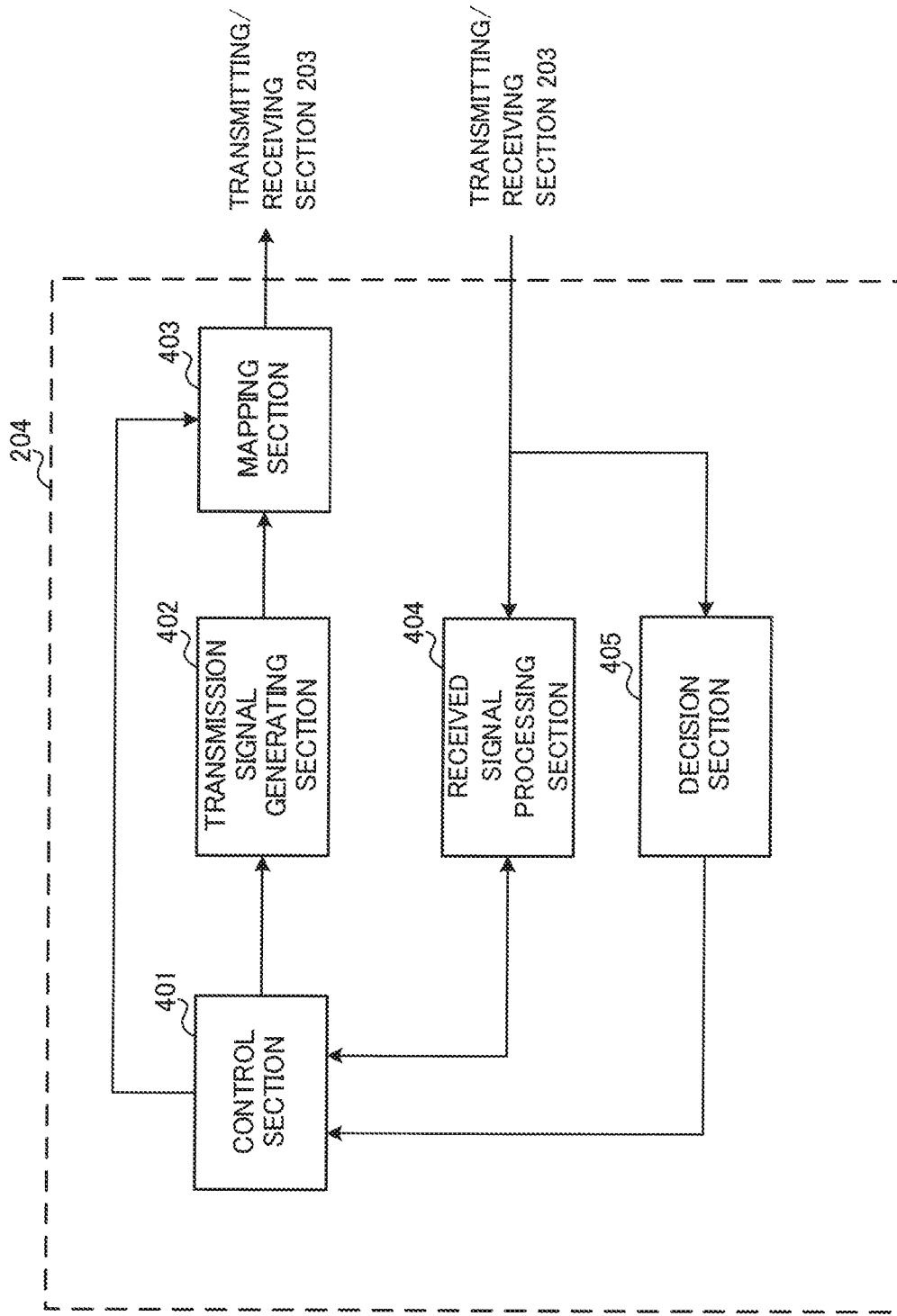
FIG. 19 is a diagram to show an example of a functional structure of a user terminal according to present embodiment.

FIG. 19 is a diagram to show an example of a functional structure of a user terminal according to the present embodiment. Note that, although FIG. 19 primarily shows functional blocks that pertain to characteristic parts of the present embodiment, the user terminal 20 has other functional blocks that are necessary for radio communication as well. As shown in FIG. 19, the baseband signal processing section 204 provided in the user terminal 20 has a control section 401, a transmission signal generation section 402, a mapping section 403, a received signal processing section 404 and a decision section 405.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 can control the transmission signal generation section 402, the mapping section 403 and the received signal processing section 404.

The control section 401 can control the transmission of UL signals based on the TA timer, and make the TA timer count shortened TTI or normal TTI units (see FIGS. 5B and 5C). Further, the control section 401 controls the transmission of UL signals, and controls, for example, the random access procedures based on shortened TTIs and/or normal TTIs having a TTI duration of one ms (see FIG. 7 to FIG. 9).

Further, the control section 401 can perform control so that PRACH transmission is carried out by using PRACH resources configured a predetermined normal TTI duration after a PRACH transmission-commanding downlink control channel is received, or by using PRACH resources configured a predetermined shortened TTI duration after downlink control information is received (see FIG. 8).

Further, the control section 401 can control the transmission of UL signals per TAG formed with cells having the same TTI duration (see FIG. 11). In such a case, the control section 401 can control UL transmission on the assumption that different requirements (for example, the TTIs, the transient period etc.) than CCs of normal TTIs are applied to CCs of shortened TTIs.

Further, the control section 401 can control the transmission of UL signals per TAG comprised of a plurality of cells having different TTI durations (see FIG. 13A). In such a case, the control section 401 can control UL transmission on the assumption that a transient period occurs in the middle of UL transmission in the same TAG (see FIG. 13B). For the control section 401, a controller, a control circuit or a control device that can be described based on common understanding of the technical field to which the present invention pertains can be used.

The transmission signal generation section 402 generates UL signals based on commands from the control section 401, and outputs these signals to the mapping section 403. For example, the transmission signal generation section 402 generates uplink control signals such as delivery acknowledgement signals (HARQ-ACKs), channel state information (CSI) and so on, based on commands from the control section 401.

Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal. For the transmission signal generation section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. When downlink signals (PDSCH) are transmitted from multiple CCs (for example, six or more CCs), retransmission control decisions (ACKs/NACKs) are made on a per CC basis, and output to the control section 401. For the decision section 405, a decision maker, a decision making circuit or a decision making device that can be described based on common understanding of the technical field to which the present invention pertains can be used.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 20:
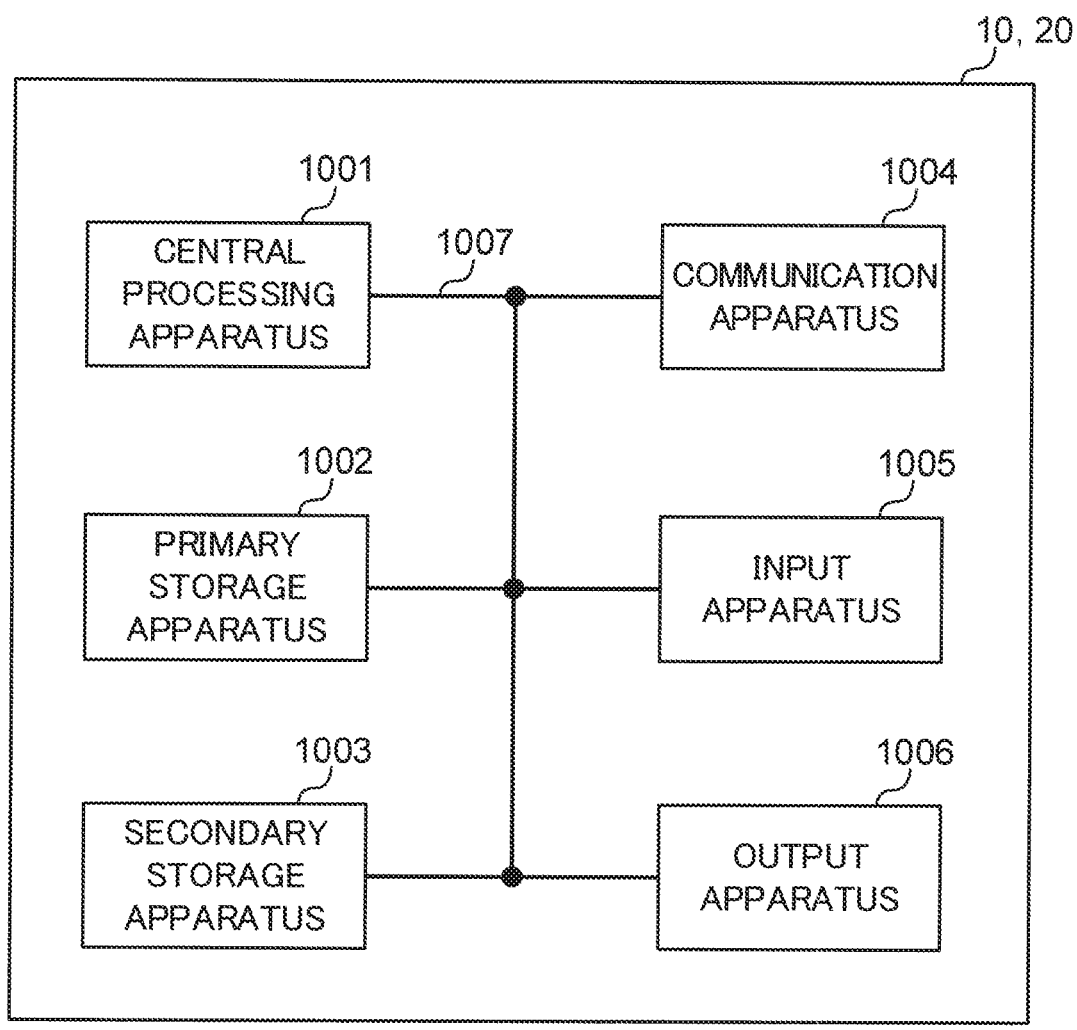
FIG. 20 is a diagram to show an example hardware structure of a radio base station and a user terminal according to an embodiment of the present invention.

That is, a radio base station, a user terminal and so on according to an embodiment of the present invention may function as a computer that executes the processes of the radio communication method of the present invention. FIG. 20 is a diagram to show an example hardware structure of a radio base station and a user terminal according to an embodiment of the present invention. Physically, a radio base station 10 and a user terminal 20, which have been described above, may be formed as a computer apparatus that includes a processor 1001, a memory 1002, a storage 1003, a communication apparatus 1004, an input apparatus 1005, an output apparatus 1006 and a bus 1007.

Note that, in the following description, the word. "apparatus" may be replaced by "circuit," "device," "unit" and so on. Note that the hardware structure of the radio base station 10 and the user terminal 20 may be designed to include one or more of each apparatus shown in the drawings, or may be designed not to include part of the apparatuses.

Each function of the radio base station 10 and user terminal 20 is implemented by reading predetermined software (programs) on hardware such as the processor 1001, the memory 1002 and so on, and controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU) including an interface with a peripheral device, a control device, a computing device, a register, and the like. For example, the above-described baseband signal process section 104 (204), the call processing section 105 and so on may be implemented by the processor 1001.

Further, the processor 1001 reads a program (program code), a software module or data from the storage 1003 and/or the communication apparatus 1004 to the memory 1002, and executes various processes according to these. As for the programs, programs to allow the computer to execute at least part of the operations of the above-described embodiments may be used. For example, the control section 401 of the user terminals 20 may be stored in memory 1002 and implemented by a control program that operates on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory" (primary storage apparatus), or the like. The memory 1002 can store executable programs (program codes), software modules, and the like for implementing the wireless communication method according to one embodiment of the present invention.

The storage 1003 is a computer readable recording medium, and is configured with at least one of an optical disk such as a CD-ROM (Compact Disc ROM), a hard disk drive, a flexible disk, a magneto-optical disk, a flash memory and so on. The storage 1003 may be referred to as a "secondary storage device."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Further, apparatuses such as the processor 1001 and the memory 1002 are connected by the bus 1007 for communicating information. The bus 1007 may be formed with a single bus, or may be formed with buses that vary between the apparatuses.

For example, the radio base station 10 and the user terminal 20 may be structured to include hardware such as an a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Further, a radio frame may be comprised of one or more periods (frames) in the time domain. One or more periods (frames) constituting a radio frame may be referred to as a "subframe." Further, a subframe may be comprised of one or more slots in the time domain. Further, a slot may be comprised of one or more symbols (OFDM symbols, SC-FDMA symbols, etc.) in the time domain.

Radio frames, subframes, slots and symbols all represent time units for signal communication. Radio frames, subframes, slots and symbols may be all associated with different names. For example, one subframe may be referred to as a "transmission time interval" (TTI), or a plurality of consecutive subframes may be referred to as a "TTI," or one slot may be referred to as a "TTI." That is, a subframes and a TTI may be a subframe (one ms) in existing LTE, may be a shorter period than one ms (for example, 1 to 13 symbols), or may be a longer period than one ms.

Here, a TTI refers to the minimum time unit of scheduling in radio communication, for example. For example, in LTE systems, the radio base station performs scheduling to allocate radio resources (such as frequency bandwidth and transmission power that can be used in each user terminal) in units of TTIs to each user terminal. The definition of TTIs is not limited to this.

A resource block (RB) is a resource allocation unit in the time domain and the frequency domain, and may include one or a plurality of consecutive subcarriers in the frequency domain. Also, an RB may include one or more symbols in the time domain and may be one slot, one subframe or one TTI long. One TTI and one subframe each may be comprised of one or more resource blocks. Incidentally, an RB may be referred to as a "physical resource block" (PRB: Physical RB), a "PRB pair," an "RB pair," or the like.

Further, a resource block may be comprised of one or more resource elements (REs). For example, one RE may be a radio resource area of one subcarrier and one symbol.

Note that the structures of radio frames, subframes, slots, symbols and the like described above are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Further, a radio base station in this specification may be replaced by a user terminal. For example, each aspect/embodiment of the present invention may be applied to a configuration in which communication between a radio base station and a user terminal is replaced with communication between a plurality of user terminals (D2D: Device-to-Device). In this case, the user terminal 20 may have the functions of the radio base station 10 described above. In addition, wording such as "uplink" and "downlink" may be read as "side." For example, an uplink channel may be read as a side channel.

Likewise, a user terminal in this specification may be replaced by a radio base station. In this case, the radio base station 10 may have the function of the user terminal 20 described above.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, (Downlink Control Information) and UCI (Uplink Control Information)), higher layer signaling (for example, RRC (Radio Resource Control) signaling, broadcast information (MIB (Master Information Block) and SIBs (System Information Blocks)) and MAC (Medium Access Control) signaling and so on), other signals or combinations of these. Also, RRC signaling may be referred to as "RRC messages," and can be, for example, an RRC connection setup message, RRC connection reconfiguration message, and so on. Also, MAC signaling may be reported, for example, by MAC control elements (MAC CEs (Control Elements)).

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-255283, filed on Dec. 25, 2015, including the specification, drawings and abstract, is incorporated herein by reference in its entirety.

The invention claimed is:

1. A terminal comprising:
a receiver that receives a timing advance command;
a processor that controls a time alignment timer which starts or restarts in response to reception of the timing advance command, in a same time unit as a subframe, both for uplink (UL) transmission using a shorter time unit than the subframe and for UL transmission using the same time unit as the subframe; and
a transmitter that performs UL transmission by using a time unit that is shorter than the subframe, based on the time alignment timer, which is controlled in the same time unit as the subframe.

2. The terminal according to claim 1, wherein the processor controls not to perform UL transmission other than random access preamble transmission for a cell corresponding to the time alignment timer, when the time alignment timer expires.

3. The terminal according to claim 1, wherein the processor is allowed to receive a MAC control element including the time advance command by using a downlink shared channel that is scheduled by downlink control information transmitted in the shorter time unit than the subframe.

4. A radio communication method comprising:
receiving a timing advance command;
controlling a time alignment timer which starts or restarts in response to reception of the timing advance command, in a same time unit as a subframe, both for uplink (UL) transmission using a shorter time unit than the subframe and for UL transmission using the same time unit as the subframe; and
performing UL transmission by using a time unit that is shorter than the subframe, based on the time alignment timer, which is controlled in the same time unit as the subframe.

5. The terminal according to claim 2, wherein the processor is allowed to receive a MAC control element including the time advance command by using a downlink shared channel that is scheduled by downlink control information transmitted in the shorter time unit than the subframe.

6. A radio communication system comprising:
a base station comprising a transmitter that transmits a timing advance command; and
a terminal comprising:
a receiver that receives the timing advance command;
a processor that controls a time alignment timer which starts or restarts in response to reception of the timing advance command, in a same time unit as a subframe, both for uplink (UL) transmission using a shorter time unit than the subframe and for UL transmission using the same time unit as the subframe; and a transmitter that performs UL transmission by using a time unit that is shorter than the subframe, based on the time alignment timer, which is controlled in the same time unit as the subframe.

* * * * *